United States Patent
Dole et al.

(10) Patent No.: US 12,527,707 B2
(45) Date of Patent: Jan. 20, 2026

(54) ATTACHMENT MEMBERS FOR A SLINGBAR COMPONENT OF A LIFT SYSTEM

(71) Applicant: LIKO Research & Development AB, Luleå (SE)

(72) Inventors: Andrew Dole, Batesville, IN (US); Chris L Hildenbrand, Osgood, IN (US)

(73) Assignee: LIKO Research & Development AB, Luleå (SE)

(*) Notice: Subject to any disclaimer, the term of this patent is extended or adjusted under 35 U.S.C. 154(b) by 45 days.

(21) Appl. No.: 18/491,265

(22) Filed: Oct. 20, 2023

(65) Prior Publication Data
US 2024/0041682 A1 Feb. 8, 2024

Related U.S. Application Data

(63) Continuation of application No. 16/952,727, filed on Nov. 19, 2020, now Pat. No. 11,833,095.

(60) Provisional application No. 62/939,220, filed on Nov. 22, 2019.

(51) Int. Cl.
A61G 7/10 (2006.01)

(52) U.S. Cl.
CPC ......... *A61G 7/1078* (2013.01); *A61G 7/1015* (2013.01); *A61G 7/1051* (2013.01)

(58) Field of Classification Search
CPC .. A61G 7/1078; A61G 7/1015; A61G 7/1051; A61G 7/1061; A61G 7/1069; F16B 45/023; F16B 45/026; F16B 45/043; F16B 45/034; B66C 1/36
USPC .......................................................... 5/83.1
See application file for complete search history.

(56) References Cited

U.S. PATENT DOCUMENTS

| | | | |
|---|---|---|---|
| 1,350,297 A | | 8/1920 | Cooley |
| 3,563,589 A | * | 2/1971 | Kwasiborski, Jr. ...... E05B 83/36 292/216 |
| 3,570,760 A | * | 3/1971 | Crain ...................... G06C 15/26 235/137 |
| 3,583,742 A | * | 6/1971 | Kwasiborski, Jr. ... E05B 85/243 292/216 |
| 3,596,957 A | * | 8/1971 | Gionet .................... E05B 83/16 292/341.16 |

(Continued)

FOREIGN PATENT DOCUMENTS

| | | | |
|---|---|---|---|
| EP | 1145699 A1 | 10/2001 | |
| FR | 2731912 A1 * | 9/1996 | ............... A62B 1/04 |
| FR | 2731912 B1 | 5/1997 | |

OTHER PUBLICATIONS

Extended European Search Report dated Mar. 24, 2021, for EP Patent Application No. 20207830.9. pp. 1-8.

*Primary Examiner* — Amber R Anderson
*Assistant Examiner* — Luke Hall
(74) *Attorney, Agent, or Firm* — Dinsmore & Shohl LLP

(57) ABSTRACT

A slingbar includes a sling attachment member. The sling attachment member includes a frame including a base having a top end and a bottom end, and a hook extending from the bottom end to a hook terminus. The hook terminus and the top end of the base define an opening. The hook, base, and opening bound an interior of the attachment member. A closure element includes an outboard gate hinged to the hook terminus and an inboard gate hinged to the base. The gates have a default state in which each gate extends laterally only part way across the opening.

18 Claims, 15 Drawing Sheets

(56) References Cited

U.S. PATENT DOCUMENTS

| | | | | |
|---|---|---|---|---|
| 3,631,695 A * | 1/1972 | Perlick | E05B 41/00 | 70/438 |
| 3,944,972 A * | 3/1976 | Chandler | B60Q 9/002 | 340/425.5 |
| 4,060,701 A * | 11/1977 | Epley | H04R 29/00 | 73/584 |
| 4,115,670 A * | 9/1978 | Chandler | H01H 25/002 | 200/16 R |
| 4,262,811 A * | 4/1981 | Montague | B66C 21/04 | 212/87 |
| 4,509,311 A * | 4/1985 | Hartl | B65B 61/28 | 53/477 |
| 4,613,180 A * | 9/1986 | Pope | F16B 45/026 | 24/598.5 |
| 4,741,563 A * | 5/1988 | Cohrs | E05B 65/1046 | 292/168 |
| 5,160,010 A * | 11/1992 | Peterson | A47C 20/08 | 5/613 |
| 5,210,914 A * | 5/1993 | Katsma | F16B 45/023 | 24/599.6 |
| 5,416,955 A * | 5/1995 | Katsma | F16B 45/027 | 24/599.6 |
| 5,615,919 A * | 4/1997 | Ivey | E05B 63/0017 | 292/164 |
| 5,857,229 A * | 1/1999 | Magnani, Jr. | A47D 13/063 | 5/98.1 |
| 6,174,010 B1 * | 1/2001 | Fanger | A61G 7/1015 | 294/81.4 |
| 6,202,229 B1 * | 3/2001 | Cheng | A47D 13/063 | 5/98.1 |
| 6,485,216 B1 * | 11/2002 | Cheng | B62B 7/06 | 74/567 |
| 6,675,412 B2 * | 1/2004 | Faucher | A61G 7/1042 | 294/82.11 |
| 6,729,791 B1 * | 5/2004 | Chen | A47D 13/063 | 403/102 |
| 8,508,148 B1 * | 8/2013 | Carley | G08C 17/02 | 439/620.02 |
| 9,103,368 B2 * | 8/2015 | Mendes | F16C 11/10 | |
| 9,463,128 B2 * | 10/2016 | Ng | A61G 7/1015 | |
| 2005/0287859 A1 * | 12/2005 | Komizo | B66C 1/36 | 439/342 |
| 2008/0022497 A1 * | 1/2008 | Thompson | F16B 45/027 | 24/598.1 |
| 2008/0104787 A1 * | 5/2008 | Keenan | A45D 34/04 | 15/210.1 |
| 2008/0117624 A1 * | 5/2008 | Kirkov | A43B 3/36 | 362/108 |
| 2008/0157507 A1 * | 7/2008 | Tayar | B60D 1/18 | 280/490.1 |
| 2008/0222859 A1 * | 9/2008 | Chepurny | F16B 45/026 | 5/81.1 R |
| 2009/0080183 A1 * | 3/2009 | Opolka | F21V 23/0421 | 362/205 |
| 2010/0187844 A1 * | 7/2010 | Piinspanen | B66C 1/36 | 294/82.2 |
| 2013/0167847 A1 * | 7/2013 | Rogers | A61F 5/37 | 294/81.1 |
| 2014/0203580 A1 * | 7/2014 | Knox | B60D 1/36 | 294/82.11 |
| 2014/0373320 A1 * | 12/2014 | Nemec | F16B 45/036 | 24/599.6 |
| 2015/0130199 A1 * | 5/2015 | Pantsar | F16B 45/026 | 294/82.2 |
| 2015/0360916 A1 * | 12/2015 | Kearney | B66C 1/34 | 294/82.15 |
| 2017/0027794 A1 * | 2/2017 | Andersson | A61G 7/1017 | |
| 2017/0360218 A1 * | 12/2017 | Dziak | A47D 13/063 | |
| 2019/0003521 A1 * | 1/2019 | MacArthur | F16B 45/026 | |
| 2019/0008711 A1 * | 1/2019 | Karlsson | A61G 7/1015 | |
| 2019/0208758 A1 | 7/2019 | Kacoyanis | | |
| 2019/0247256 A1 * | 8/2019 | Huang | A61G 7/1046 | |
| 2019/0308750 A1 * | 10/2019 | Duval | B64D 1/02 | |
| 2020/0062553 A1 * | 2/2020 | Toon | F16B 45/023 | |
| 2020/0102773 A1 * | 4/2020 | Sobecki | E05B 85/107 | |
| 2020/0255264 A1 * | 8/2020 | Vencl | B66C 1/36 | |
| 2020/0307962 A1 * | 10/2020 | Autissier | B66C 1/36 | |
| 2020/0377343 A1 * | 12/2020 | Lemburg | B66C 1/34 | |
| 2021/0093500 A1 * | 4/2021 | Stokman | A61G 7/1061 | |
| 2021/0139289 A1 * | 5/2021 | Hänsler | B66C 1/34 | |
| 2021/0146171 A1 * | 5/2021 | Golkowski | E04G 17/002 | |
| 2021/0359391 A1 * | 11/2021 | Hong | H04B 5/77 | |

\* cited by examiner

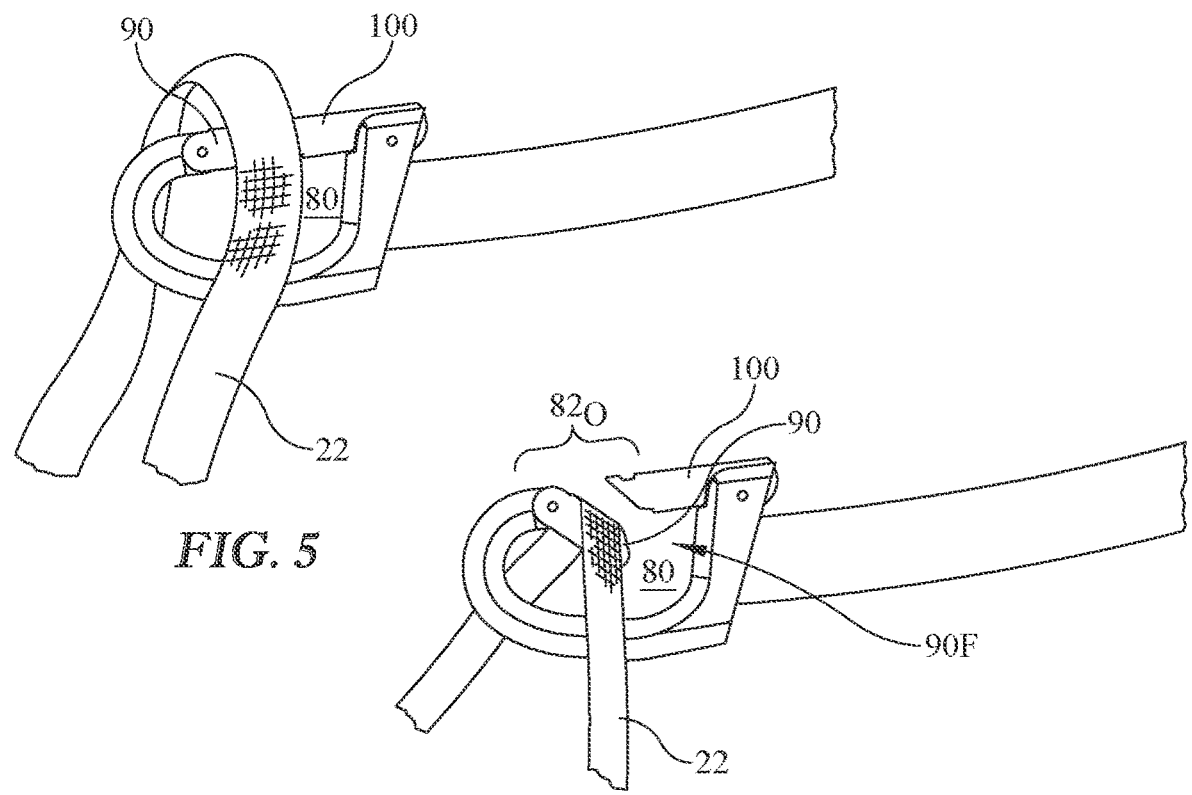
FIG. 5
FIG. 6
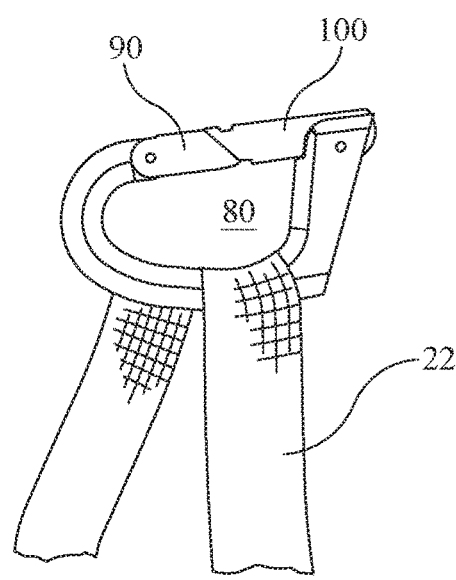
FIG. 7

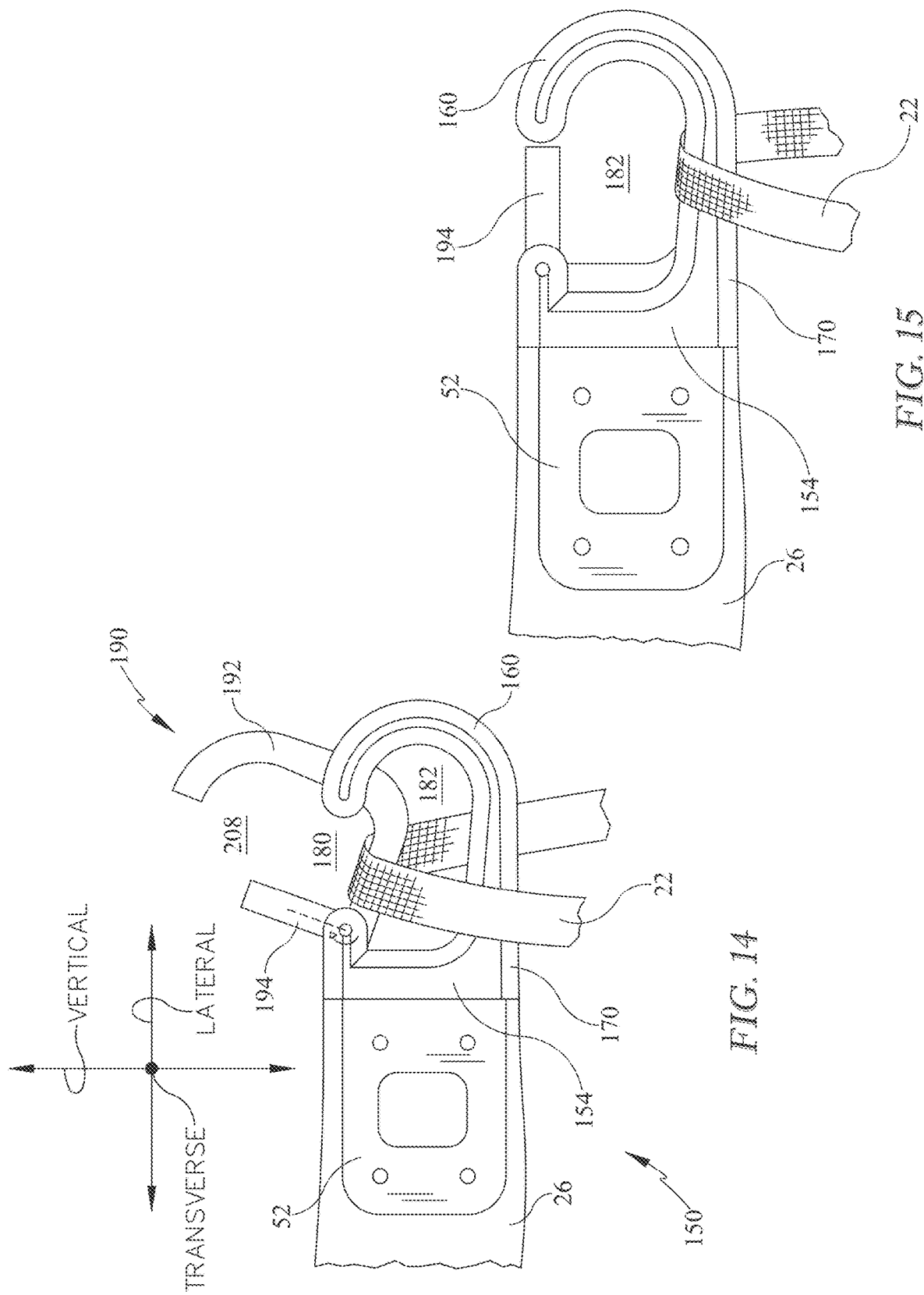

ATTACHMENT MEMBERS FOR A SLINGBAR COMPONENT OF A LIFT SYSTEM

CROSS REFERENCE TO RELATED APPLICATIONS

The present application is a continuation of U.S. Patent Application Ser. No. 16/952,727, entitled "Attachment Members for a Slingbar Component of a Lift System" and filed Nov. 19, 2020, which claims the benefit of U.S. Provisional Application Ser. No. 62/939,220 filed Nov. 22, 2019 and entitled "Attachment Members for a Slingbar Component of a Lift System," the entirety of which is incorporated by reference herein.

FIELD

The subject matter described herein relates to lift systems for transporting and assisting persons with compromised mobility, and in particular to attachment members and associated closure elements for a slingbar component of the lift system.

TECHNICAL BACKGROUND

Caregivers in hospitals and other health care facilities may employ a lift system to transport patients suffering from limited mobility, or to assist those patients in their efforts to move about on their own. A representative lift system includes a hoist. One type of hoist is a freestanding, moveable frame unit that is supported on the floor by wheels or casters. Another type of hoist includes a carriage supported from the ceiling of the facility by a ceiling mounted rail system.

A representative lift system also includes a slingbar having a slingbar hub and a pair of arms that extend in laterally opposite directions from the slingbar hub. A hook-like element resides at the end of each arm. When the lift system is used to lift a patient, the slingbar is attached to the hoist.

A typical lift system also includes a sling made of cloth or other material suitable for cradling the patient. The sling has two or more straps or loops.

In practice, a caregiver or other user positions a patient on the sling, often by sliding the sling under the patient while the patient's weight is supported on a bed or chair. The user engages the sling straps with the hook-like elements of the slingbar and operates the hoist to lift and transport the patient to a destination (or to assist the patient in moving on his own). After the patient's weight has been transferred from the sling to some other support (e.g. another bed or chair) at the destination, the user can disengage the straps from the hook-like elements of the slingbar.

In order to ensure that the sling straps remain engaged with the hook-like elements of the slingbar, it is prudent to outfit each hook-like element with a closure element. The closure element ensures that the sling strap remains engaged with the hook-like element during patient lifting and transport. Preferably, the closure element allows the user to easily carry out the engagement and disengagement of a sling strap with the hook-like element. In particular, a closure element that can be operated by the caregiver with only one hand would be beneficial because it would enable the caregiver to use the other hand to stabilize the slingbar and/or steady the patient. Preferably, the closure element also will not permit the strap to be released from the hook-like element without some overt action on the part of the user or unless the patient's weight is no longer carried by the slingbar.

Accordingly, a need exists for alternative attachment members for slingbars of a lift system.

SUMMARY

A first aspect A1 includes a slingbar having a sling attachment member, the sling attachment member comprising: a frame comprising a base having a top end and a bottom end, and a hook extending from the bottom end to a hook terminus, the hook terminus and the top end of the base defining an opening, and the hook, the base, and the opening bounding an interior of the sling attachment member; and a closure element comprising an outboard gate hinged to the hook terminus and an inboard gate hinged to the base, the outboard gate and the inboard gate each having a default state in which each gate extends laterally only part way across the opening.

A second aspect A2 includes the slingbar of A1 wherein one of the inboard gate and the outboard gate is an inwardly rotatable gate and the other of the inboard gate and the outboard gate is an outwardly rotatable gate.

A third aspect A3 includes the slingbar of any of A1-A2 comprising an outboard spring which biases the outboard gate toward the default state and an inboard spring which biases the inboard gate toward the default state.

A fourth aspect A4 includes the slingbar of any of A1-A3 comprising an outboard spring which resists but does not prevent rotatability of the outboard gate in a first rotational sense, and an inboard spring which resists but does not prevent rotatability of the inboard gate in a second rotational sense which is opposite the first rotational sense.

A fifth aspect A5 includes the slingbar of any of A1-A4 wherein the inboard gate and the outboard gate contact each other in the default state.

A sixth aspect A6 includes the slingbar of any of A1-A5 wherein the inboard gate and the outboard gate each comprise a free end that is complementary to the free end of the other of the inboard gate and the outboard gate.

A seventh aspect A7 includes the slingbar of any of A1-A6 wherein the free end of the outboard gate and the free end of the inboard gate are chamfered.

An eighth aspect A8 includes the slingbar of any of A1-A7 wherein: each of the inboard gate and the outboard gate has an open state and a closed state; and only one of the inboard gate or the outboard gate is required to be in the open state to accommodate passage of an object through the opening.

A ninth aspect A9 includes a slingbar comprising a sling attachment member, the sling attachment member comprising: a frame comprising a base with a top end and a bottom end, an elbow laterally spaced from the base and having a bottom end and a terminus, and a bottom segment joining the bottom end of the base to the bottom end of the elbow, wherein the top end of the base and the terminus define a laterally extending opening; and a closure element comprising an actuator wing and a closure wing, the closure element hinged to the top end of the base at a juncture of the actuator wing and the closure wing, the closure element positionable in: A) an open orientation in which at least part of the actuator wing spans across the laterally extending opening; and B) a closed orientation in which at least part of the closure wing spans across the laterally extending opening.

A tenth aspect A10 includes the slingbar of A9 comprising a spring which biases the closure element to the open orientation, wherein the closure element is movable to the closed orientation by a force acting on the actuator wing thereof.

An eleventh aspect A11 includes the slingbar of A9 or A10 wherein the actuator wing comprises an actuator wing terminus, the closure wing has a closure wing terminus, and the actuator wing terminus and the closure wing terminus are spaced from each other thereby defining an aperture.

A twelfth aspect A12 includes the slingbar of any of A9-A11 wherein the sling attachment member comprises: an open state corresponding to the open orientation of the closure element; and a closed state corresponding to the closed orientation of the closure element.

A thirteenth aspect A13 includes the slingbar of any of A9-A12 wherein, when the sling attachment member is in the open state, the aperture is exposed to surroundings of an interior of the sling attachment member.

A fourteenth aspect A14 includes the slingbar of any of A9-A13 wherein: when the closure element is in the open orientation the closure wing is rotationally misaligned with the opening of the frame and the actuator wing is rotationally misaligned with the bottom segment and the elbow of the frame; and when the closure element is in the closed orientation the closure wing is rotationally aligned with the opening of the frame and the actuator wing is rotationally aligned with the bottom segment and the elbow of the frame.

A fifteenth aspect A15 includes the slingbar of any of A9-A14 wherein when the closure element is in the closed orientation the actuator wing nests in a slot formed from the base, the bottom segment and the elbow.

A sixteenth aspect A16 includes a sling attachment member, the sling attachment member comprising: a fixed orientation lower jaw comprising an upper surface comprising an upper inboard segment, an upper outboard segment, and an upper intermediate segment laterally between the upper inboard segment and the upper outboard segment; a variable orientation upper jaw comprising a lower surface comprising a lower inboard segment, a lower outboard segment, and a lower intermediate segment laterally between the lower inboard segment and the lower outboard segment; the upper inboard segment comprising a descending contour with increasing outboard displacement, and the lower inboard segment comprising an ascending contour with increasing outboard displacement, wherein the descending contour and the ascending contour are adapted so that an object urged laterally outwardly can separate the upper intermediate segment and the lower intermediate segment from each other and pass outwardly between the upper intermediate segment and the lower intermediate segment.

A seventeenth aspect A17 includes the sling attachment member of A16 wherein the upper outboard segment comprises an ascending contour with increasing outboard displacement and the lower outboard segment comprises a descending contour with increasing outboard displacement.

An eighteenth aspect A18 includes the sling attachment member of any of A16-A17 wherein the descending contour of the upper inboard segment comprises an inflection point outboard of which the descending contour becomes progressively more shallow with increasing outboard displacement, and the ascending contour of the lower inboard segment comprises an inflection point outboard of which the ascending contour becomes progressively more shallow with increasing outboard displacement.

A nineteenth aspect A19 includes the sling attachment member of any of A16-A18 wherein the lower inboard segment includes a pocket at its inboard extremity, the pocket defined by a subsegment of the lower inboard segment which comprises a descending contour with increasing outboard displacement.

A twentieth aspect A20 includes the sling attachment member of any of A16-A19 wherein the lower inboard segment comprises a lateral extent and the subsegment comprises a subsegment lateral extent which is no more than about 25% of the lateral extent of the lower inboard segment.

A twenty-first aspect A21 includes the sling attachment member of any of A16-A20 wherein the sling attachment member comprises a closed state wherein the upper intermediate segment and the lower intermediate segment are vertically separated from each other by a minimum separation.

A twenty-second aspect A22 includes the sling attachment member of any of A16-A21 wherein the minimum separation is zero separation.

A twenty-third aspect A23 includes the sling attachment member of any of A16-A22 wherein the sling attachment member comprises a closed state wherein the upper intermediate segment and the lower intermediate segment are in line contact with each other.

A twenty-fourth aspect A24 includes the sling attachment member of any of A16-A23 comprising a biasing element to bias the variable orientation upper jaw to its closed state.

A twenty-fifth aspect A25 includes the sling attachment member of any of A16-A24 wherein the lower inboard segment and the upper inboard segment each comprise a laterally varying steepness, and the laterally varying steepness of the lower inboard segment everywhere along at least a portion of its lateral range is greater than the laterally varying steepness of the upper inboard segment anywhere along its lateral range.

A twenty-sixth aspect A26 includes the sling attachment member of any of A16-A25 wherein the descending contour of the upper inboard segment comprise an upper segment vertical range, the ascending contour of the lower inboard segment comprise a lower segment vertical range, and the lower segment vertical range exceeds the upper segment vertical range.

A twenty-seventh aspect A27 includes a slingbar comprising: a sling attachment member comprising: a frame, a portion of which defines an opening, the frame and opening defining an interior of the sling attachment member; and a closure element; and an actuating mechanism comprising: a cam; and a linkage arranged to be driven by the cam and to operate the closure element in response to motion of the cam thereby causing the closure element to block or expose the opening.

A twenty-eighth aspect A28 includes the slingbar of A27 wherein the linkage comprises a bellcrank comprising a follower arm driven by the cam and an output arm connected to the closure element.

A twenty ninth aspect A29 includes the slingbar of any of A27-A28 comprising a connector link that connects the output arm to the closure element.

A thirtieth aspect A30 includes the slingbar of any of A27-A29 comprising a cam driver adapted to move the cam.

A thirty-first aspect A31 includes the slingbar of any of A27-A30 wherein the cam driver comprises: an open position corresponding to the closure element exposing the opening; and a closed position corresponding to the closure element blocking the opening, wherein the cam driver is movable between the open position and the closed position in response to weight applied to the slingbar.

A thirty-second aspect A32 includes the slingbar of any of A27-A31 wherein the cam driver is biased to the open position and is movable toward the closed position in response to an increase in the weight applied to the slingbar.

A thirty-third aspect A33 includes the slingbar of any of A27-A32 wherein the cam driver comprises an attachment lug for attaching the slingbar to a host.

Additional features and advantages of the embodiments described herein will be set forth in the detailed description that follows, and in part will be readily apparent to those skilled in the art from that description or recognized by practicing the embodiments described herein, including the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 5 is a first view of a sequence of views showing installation of a sling strap into an interior of an attachment member of a slingbar, the attachment member including the Double Gate of FIG. 4;

FIG. 6 is a second view of a sequence of views showing installation of a sling strap into an interior of an attachment member of a slingbar, the attachment member including the Double Gate of FIG. 4;

FIG. 7 is a third view of a sequence of views showing installation of a sling strap into an interior of an attachment member of a slingbar, the attachment member including the Double Gate of FIG. 4;

FIG. 14 is a first view showing installation and removal of a sling strap in the attachment member of FIGS. 11-12;

FIG. 15 is a first view showing installation and removal of a sling strap in the attachment member of FIGS. 11-12;

DETAILED DESCRIPTION

Figure 1:
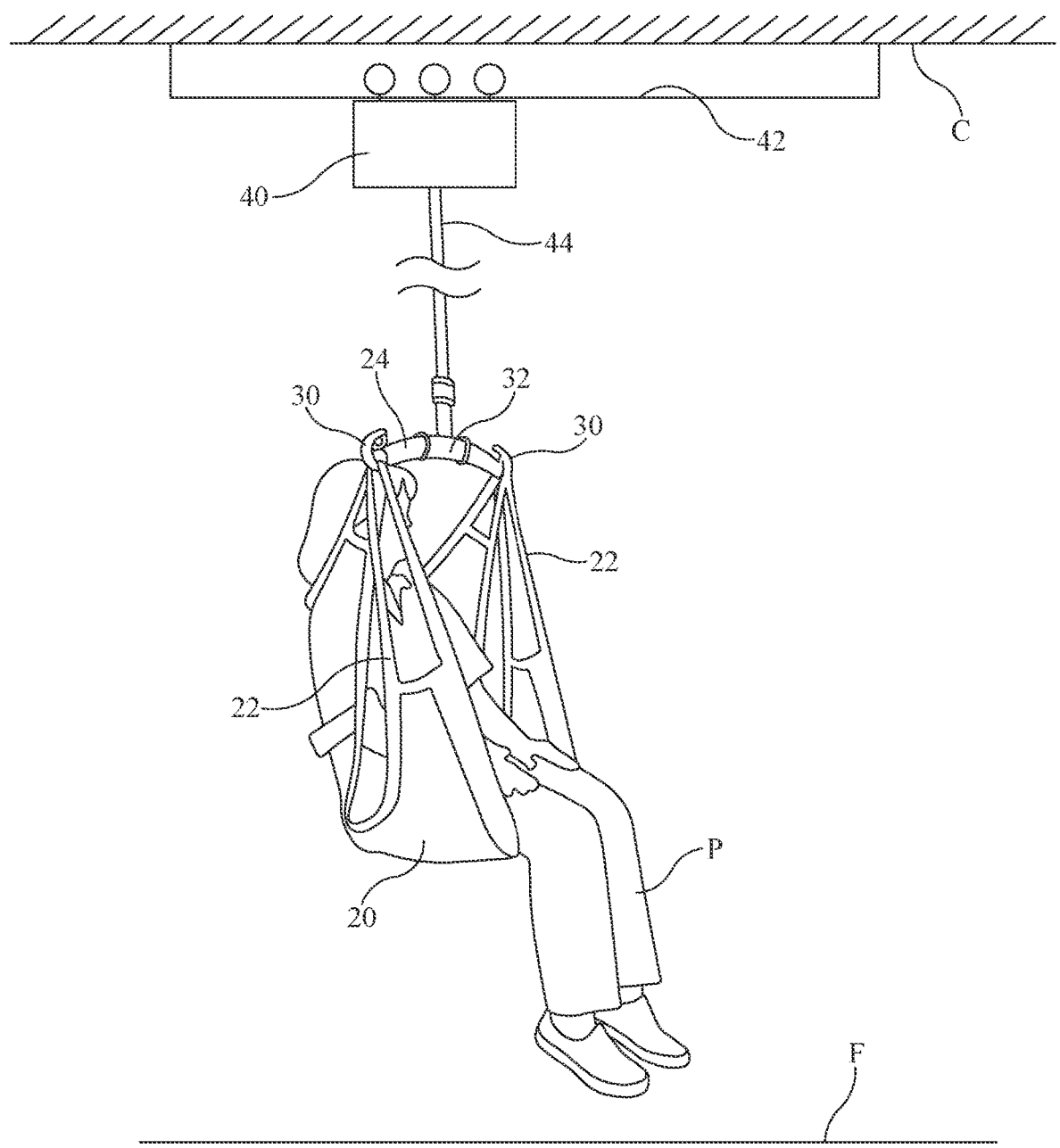
FIG. 1 is a schematic illustration of a lift system whose hoist is ceiling mounted.

Reference will now be made in detail to various embodiments of attachment members for slingbars for use with lift systems, examples of which are illustrated in the accompanying drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Embodiments of the present specification may comprise one or more of the features recited in the appended claims and/or one or more of the following features or combinations thereof.

In this specification and drawings, features similar to or the same as features already described may be identified by reference characters or numerals which are the same as or similar to those previously used. Similar elements may be identified by a common reference character or numeral, with suffixes being used to refer to specific occurrences of the element.

Figure 2:
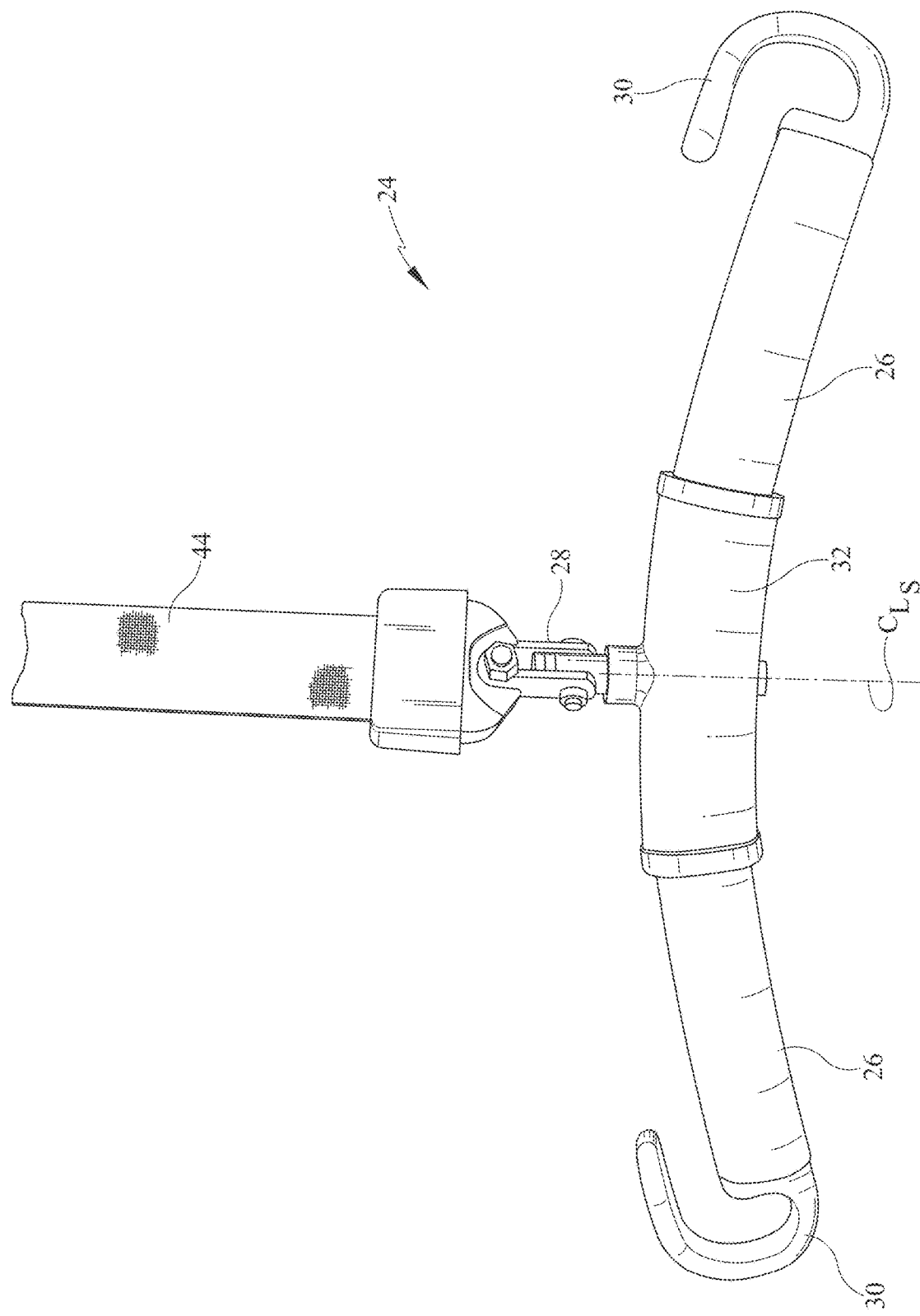
FIG. 2 is a view of a representative slingbar for a lift system, the slingbar including a pair of laterally oppositely extending arms and an attachment member at the end of each arm.

Referring to FIGS. 1-2, a lift system includes a sling 20 made of cloth or other material suitable for cradling a patient P. A typical sling includes two or more straps or loops 22. The lift system also includes a slingbar 24 having a slingbar hub 32, a pair of sling bar arms 26 that extend in laterally opposite directions from the slingbar hub 32, and a coupler 28. A hook-like element 30 resides at the end of each slingbar arm 26.

The lift system also includes a hoist. The hoist of FIG. 1 includes a carriage 40 supported from the ceiling C of the facility by a ceiling mounted rail system 42. An extendable and retractable tether 44 extends downwardly from the carriage and connects to coupler 28. The carriage houses a motor driven reel (not shown) to extend or retract the tether 44. Slingbar 24 is attached to the lower end of the tether by coupler 28. When a patient P is secured in the sling and lifted as depicted in FIG. 1, a caregiver can pull on the sling to move the carriage along the rail to a destination anywhere underneath the rail.

Figure 3:
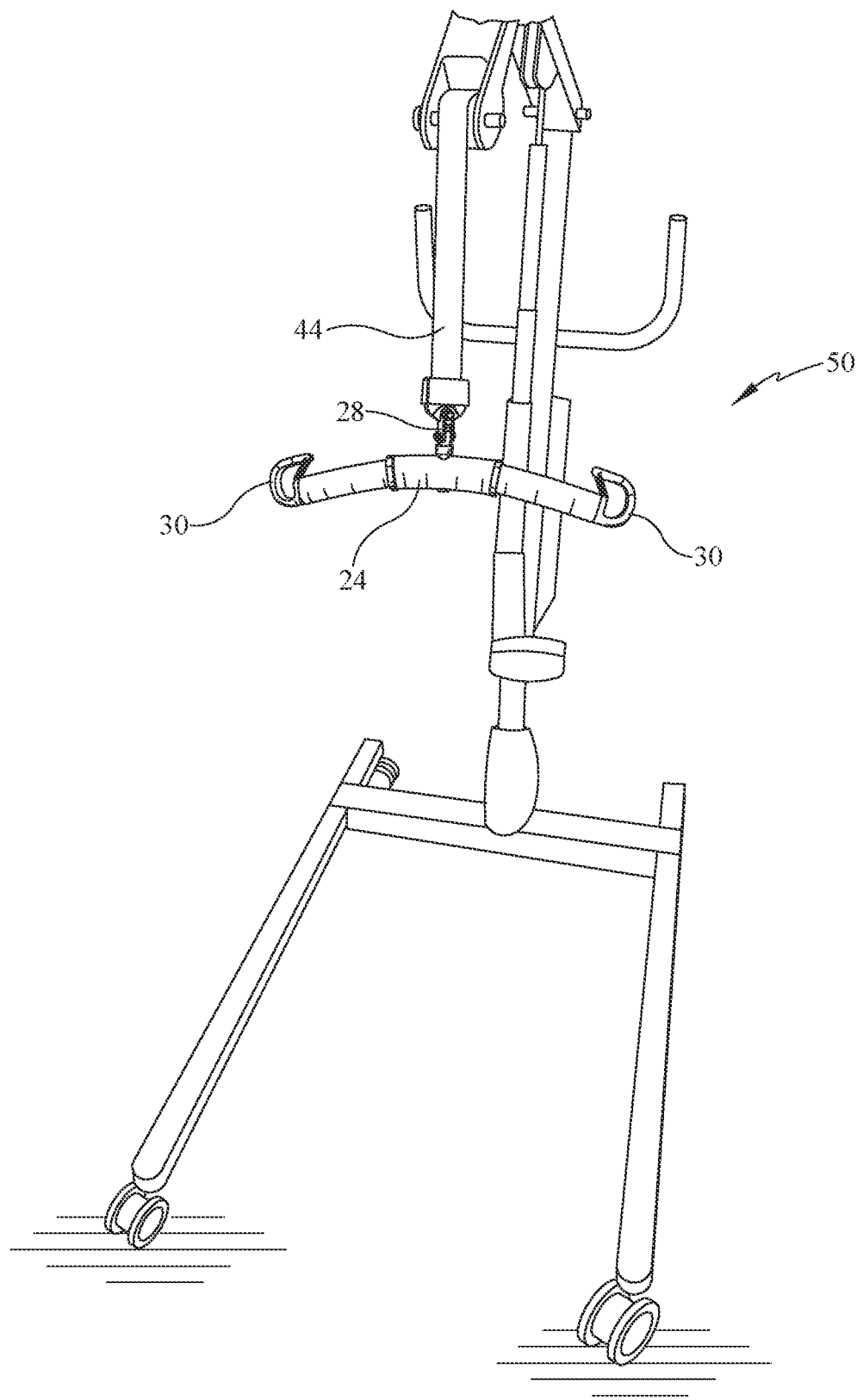
FIG. 3 is a view of a lift system whose hoist is freestanding.

Referring additionally to FIG. 3, another type of hoist is a freestanding, moveable frame unit 50, which is supported on the floor by wheels or casters. In one variant of the frame unit 50, the slingbar 24 is attached indirectly to the frame unit by a tether 44. The caregiver operates a hoist motor, not shown, to retract the tether. The caregiver then rolls the freestanding frame unit to a destination and then operates the motor to lower the patient. In another variant of the freestanding frame unit, the frame unit includes articulating patient support elements and a hydraulic or pneumatic system to drive the articulating elements. The slingbar is attached directly to the frame unit without a tether. The caregiver employs the hydraulic or pneumatic system to raise and lower the patient.

The balance of this specification describes embodiments of attachment members of a slingbar. The described attachment members each include a closure element, which guards against release of a sling strap from the attachment member. The described attachment members also enable a user to maneuver a sling strap into or out of an interior region of the attachment member using only one hand, freeing the user's other hand to steady the patient or stabilize the slingbar. The various attachment members are referred to as "Double Gate", "Swivel Style" "Funnel Style" and "Automatic Weight Actuated" and are each described in a like-named section below. In each case, the slingbar has two identical attachment members, one at each lateral end of the slingbar. Therefore, the following description describes only one of the two attachment members.

Double Gate

Figure 4:
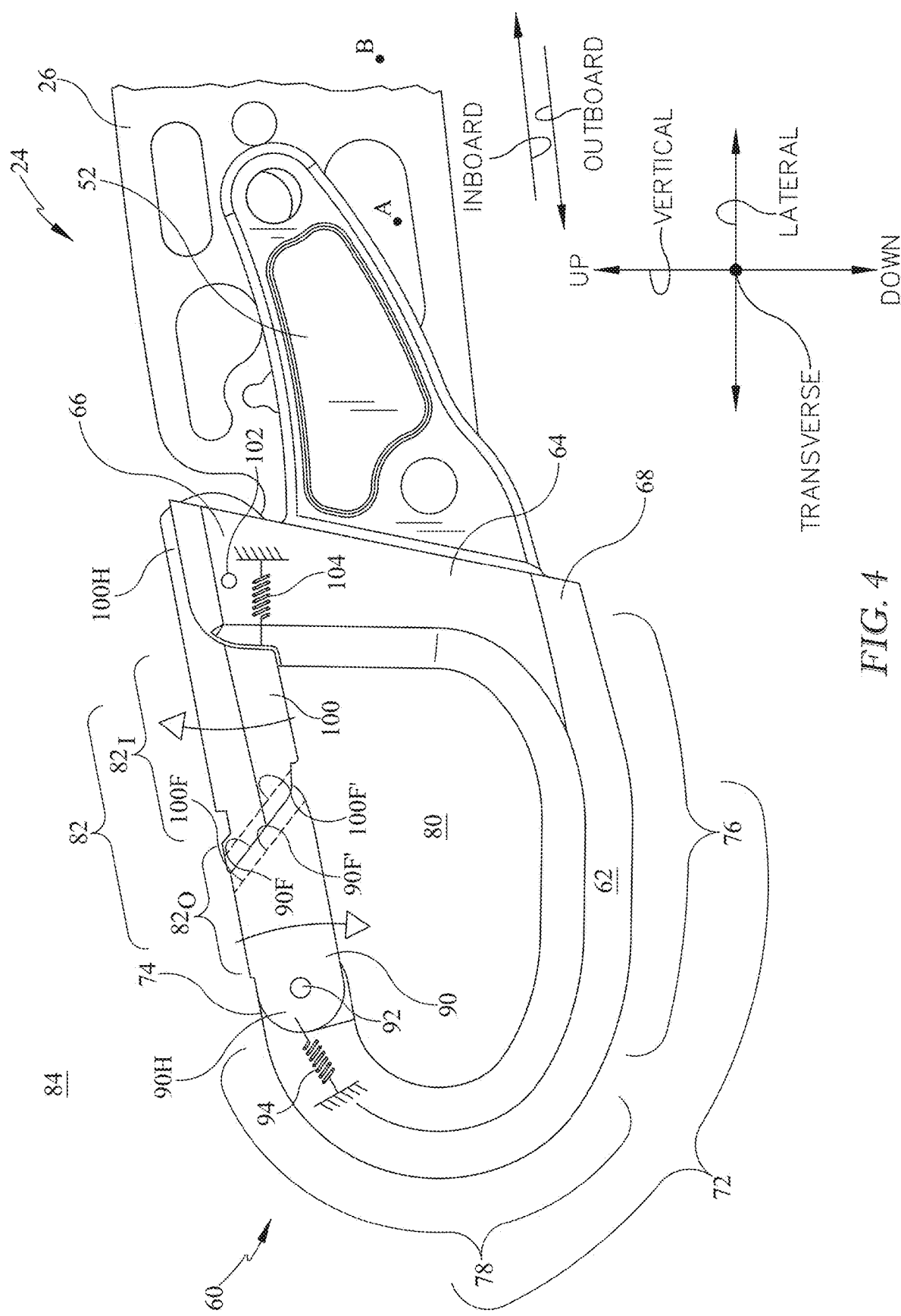
FIG. 4 is an elevation view of an attachment member of a slingbar having a "Double Gate" closure element.

FIG. 4 shows a slingbar 24 that includes a pair of slingbar arms 26 (only a portion of one is illustrated) extending from a slingbar hub 32, and an attachment member 60 at the outboard end of each arm, as described herein. FIG. 4 also includes axes to indicate the lateral, vertical, and transverse directions. The lateral direction is the direction in which slingbar arms 26 extend from the slingbar hub 32. The vertical direction is the conventional up/down direction. The transverse direction is the direction perpendicular to the vertical/lateral plane. FIG. 4 also shows a pair of arrows labeled to illustrate that the terms "inboard and outboard" signify relative lateral locations such that a location laterally closer to slingbar vertical centerline $CL_S$ (seen in FIG. 2) is more inboard than a location laterally further from centerline $CL_S$. For example, the point labelled "A" is more outboard than the point labelled "B", and the point labelled "B" is more inboard than the point labelled "A". Terms such as "up", "down", "top" and "bottom" are based on the slingbar being in the orientation seen in FIG. 2, that is with the slingbar arms generally parallel to the ground and with coupler 28 extending above the arms. The foregoing directional references apply throughout this application unless otherwise stated.

A laterally extending tab 52 connects the attachment member 60 to the slingbar arm 26. However, other arrangements for connecting the attachment member to the slingbar may be satisfactory, or the attachment member 60 may be formed integrally with the slingbar arm 26.

Attachment member 60 includes a frame 62 having a base 64 that extends from a top end 66 to a bottom end 68. The attachment member also includes a hook 72 extending from the bottom end 68 of the base 64 to a hook terminus 74. The illustrated hook 72 includes an approximately linear bottom segment 76 and a curved segment or elbow 78. The curvature of the elbow 78 is such that hook terminus 74 faces laterally back toward base 64 rather than away from the base 64 or in some other direction.

An interior region 80 of the attachment member is defined or bounded by hook 72, base 64, and an opening 82, which itself is delimited by the hook terminus 74 and the top end 66 of base 64. In FIG. 4, opening 82 is closed off by a closure element comprised of outboard and inboard gates 90, 100. Each gate extends laterally only part way across opening 82. The portion of opening 82 corresponding to outboard gate 90 may be referred to as outboard opening portion $82_O$. The portion of opening 82 corresponding to inboard gate 100 may be referred to as inboard opening portion $82_I$. The region outside the interior region 80 may be referred to as the surroundings 84 of interior region 80.

Laterally outboard gate 90 is hinged to the hook terminus at an outboard hinge 92, and a laterally inboard gate 100 is hinged to the base at an inboard hinge 102. Each gate has a hinged end, 90H, 100H respectively, proximate to its hinge, and a free end 90F, 100F remote from its hinge. An outboard spring 94, illustrated schematically, acts on outboard gate 90 and an inboard spring 104 (also illustrated schematically) acts on inboard gate 100. Spring arrangements other than the schematically illustrated coil springs may be used instead.

Figure 9:
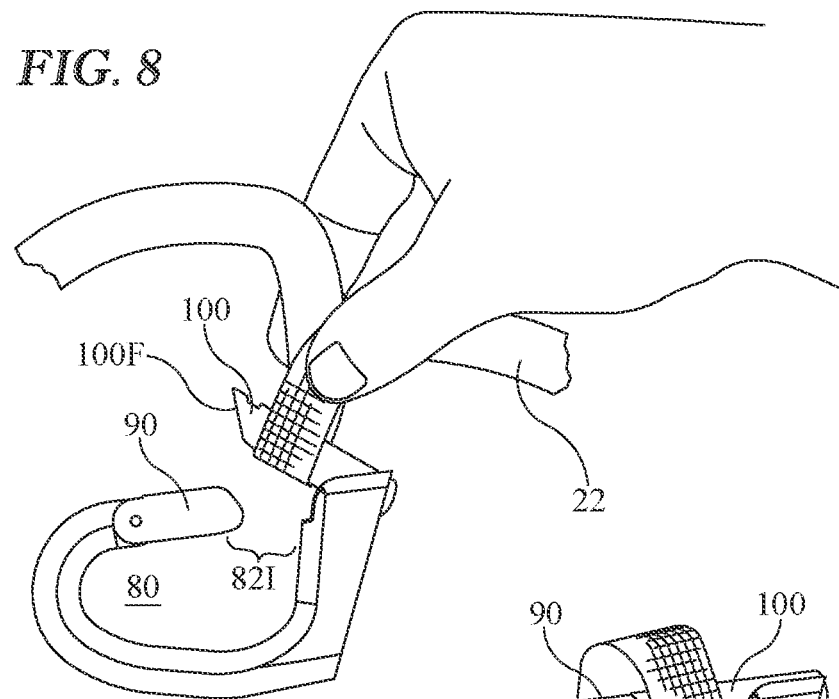
FIG. 9 is a second view are a sequence of views showing removal of a sling strap from the interior of the attachment member of FIG. 4.

One of the gates is an inwardly rotatable gate. In the illustrated embodiment, the inwardly rotatable gate is outboard gate 90. Referring additionally to FIG. 6, "inwardly rotatable" means that the gate can be rotated so that its free end 90F projects into interior region 80 of the attachment member but cannot be rotated away from the interior region so that the free end projects into surroundings 84. The other gate is an outwardly rotatable gate. In the illustrated embodiment, the outwardly rotatable gate is inboard gate 100. Referring additionally to FIG. 9, outwardly rotatable means that the gate can be rotated away from the interior region 80 of the attachment member so that its free end 100F projects into surroundings 84 but cannot be rotated so that its free end projects into interior region 80. In evaluating the absence of projection of a gate into the interior or the surroundings as just described, minor projections due to imperfections, manufacturing tolerances and component tolerances (e.g. spring constant of springs 94, 104) are not meaningful and therefore are disregarded.

The gates have a default state in which they extend toward each other across opening 82 and each gate extends laterally only part way across opening 82. The default state of the gates is considered to be the closed state of the attachment member because, as described in more detail below, a sling strap cannot unconditionally pass through the opening either into or out of interior region 80 when the attachment member is in the default state. Outboard spring 94 biases outboard gate 90 toward its default state. The outboard spring resists (but does not prevent) the inward rotatability of the outboard gate. Inboard spring 104 biases inboard gate 100 toward its default state. The inboard spring resists (but does not prevent) the outward rotatability of the inboard gate. In general, one of the springs resists but does not prevent rotatability of the outboard gate in a first rotational sense, and the other spring resists but does not prevent rotatability of the inboard gate in a second rotational sense that is opposite to the first rotational sense.

As seen in FIG. 4, the gates contact each other in the default state thereby bridging completely across opening 82. The free ends of the gates are complementary. The embodiment of FIG. 4 illustrates geometric complementarity in the form of oppositely chamfered free ends. In another configuration the gates are foreshortened and do not contact each other, as suggested by free ends 90F, 100F illustrated with dashed lines. The foreshortened gates do not bridge completely across opening 82 and so may not be as desirable as the "complete bridge" configuration depicted with solid lines even though foreshortened gates, taken collectively, effectively close off opening 82.

Each gate is rotatable to an open state depicted in FIG. 6 for gate 90 and in FIG. 9 for gate 100. When either gate is in its open state the attachment member is considered to be in its open state.

Outboard gate 90 is defined as an outboard gate not only because it is more outboard than gate 100, but also because it bridges only part way across opening 82 rather than extending all the way or substantially all the way to the top end 66 of attachment member base 64. Its length is laterally limited so that when it is opened (rotated inwardly as seen in FIG. 6) outboard opening portion $82_O$ is exposed to accommodate insertion of the sling strap into interior region 80 of the attachment member. Similarly, gate 100 is defined as an inboard gate not only because it is more inboard than gate 90, but also because it bridges only part way across opening 82 rather than extending all the way or substantially all the way to hook terminus 74. Its length is laterally limited so that when it is opened (rotated outwardly as seen in FIG. 9) inboard opening portion $82_I$ is exposed to accommodate removal of the sling strap from interior region 80 of the attachment member.

Referring to FIGS. 5-7, in practice a user inserts a sling strap 22 into interior region 80 by applying a force to the inwardly rotatable gate (e.g. outboard gate 90) thereby rotating the gate to its open state and exposing the outboard opening portion $82_O$ of opening 82. To achieve one hand operation the user may position the strap against gate 90 and pull down on the strap to apply a force to open the gate, leaving the other hand free to steady the patient or stabilize the slingbar. The user guides the strap through outboard opening portion $82_O$ and into interior region 80 of the attachment member (FIGS. 5, 6). Once the strap clears the opening and gate, the gate springs back to its closed state (FIG. 7). Alternatively, the user may apply an opening force to gate 90 by, for example, pressing on it with a finger of one hand while using the other hand to maneuver the strap through outboard opening portion $82_O$ and into the interior region 80 of the attachment member. Once the strap is clear of opening 82 and gate 90, the user releases the gate allowing spring 94 to rotate the gate back to its default state (FIG. 7).

Figure 8:
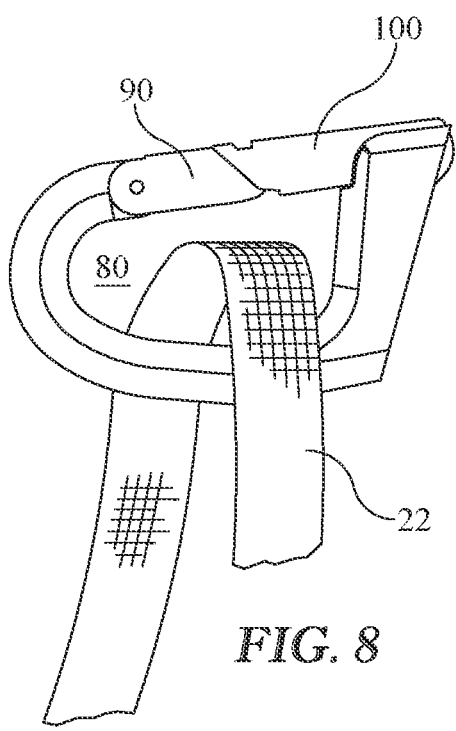
FIG. 8 is a first view are a sequence of views showing removal of a sling strap from the interior of the attachment member of FIG. 4.
Figure 10:
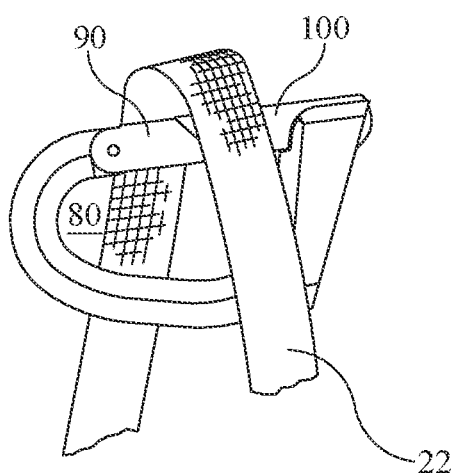
FIG. 10 is a third view of a sequence of views showing removal of a sling strap from the interior of the attachment member of FIG. 4.

Referring to FIGS. 8-10, a user removes a sling strap 22 from interior region 80 by applying a force to the outwardly rotatable gate (e.g. inboard gate 100) thereby rotating the gate to its open state and exposing the inboard opening portion $82_I$ of opening 82. To achieve one hand operation the user may position the strap against gate 100 and pull up on the strap to apply a force to open the gate, leaving the other hand free to steady the patient or stabilize the slingbar. The user guides the strap through inboard opening portion $82_I$ and out of the interior region 80 of the attachment member (FIGS. 8, 9). Once the strap clears the opening and gate, the gate springs back to its closed state (FIG. 10). Alternatively, the user may apply an opening force to gate 100 by, for example, lifting it with a finger of one hand while using the other hand to maneuver the strap through inboard opening portion $82_I$ and out of the interior region 80 of the attachment member. Once the strap is clear of opening 82 and gate 100, the user releases the gate allowing spring 104 to rotate the gate back to its default state (FIG. 10).

As seen from the foregoing, the sling strap cannot unconditionally pass through the opening either into or out of interior region 80. It can pass from the surroundings into the interior only on the condition that the outboard gate is open thereby exposing outboard opening portion $82_O$ of opening 82. It can pass from the interior to the surroundings only on the condition that the inboard gate is open thereby exposing inboard opening portion $82_I$ of opening 82. The open and closed states of the gates are such that only one of the gates is required to be in its open state to accommodate passage of an object through the opening. The force required to open a gate is applied on the same side of the hinge that covers a portion of the opening, i.e. inboard of hinge 92 and outboard of hinge 102. In other words, the hinge does not serve as a fulcrum for a force applied on the hinge that does not cover part of opening 82.

Swivel Style

Figure 12:
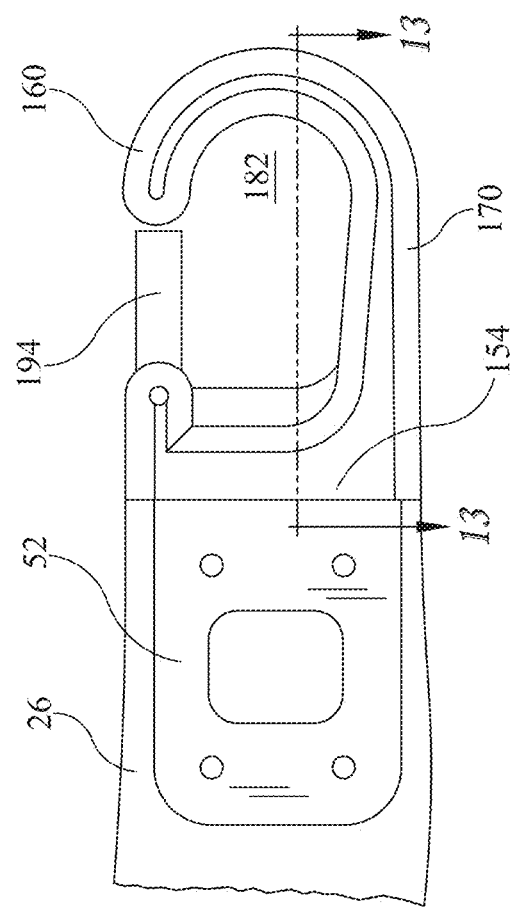
FIG. 12 is an elevation view of an attachment member of a slingbar having a "Swivel Style" closure element showing the closure element in a closed orientation.
Figure 11:
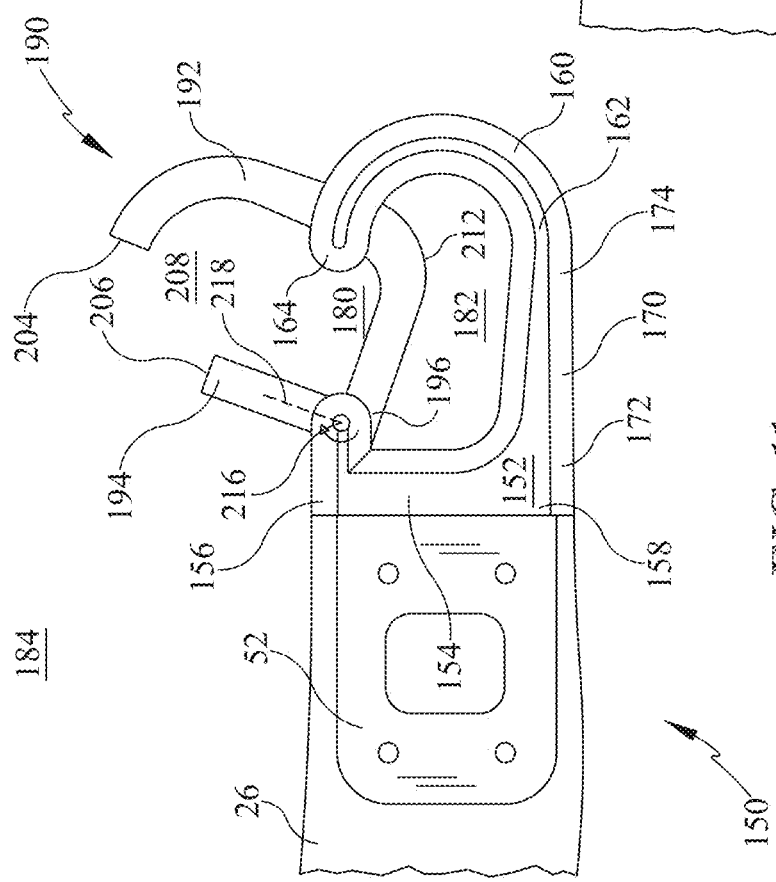
FIG. 11 is an elevation view of an attachment member of a slingbar having a "Swivel Style" closure element showing the closure element in an open orientation.

Referring to FIGS. 11-12, an attachment member 150 includes a frame 152 having a base 154 that extends vertically from a top end 156 to a bottom end 158, and an elbow 160 laterally spaced from the base 154 and having a bottom end 162 and a terminus 164. The frame also includes a bottom segment 170 joining the bottom end 162 of the base to the bottom end of the elbow 160. The bottom segment can be thought of as extending laterally from a base end 172 to an elbow end 174. Alternatively, the bottom segment and elbow, taken together, may be thought of as a hook, similar to hook 72 of FIG. 4, which is comprised of bottom segment 76 and elbow 78.

The curvature of elbow 160 is such that elbow terminus 164 faces laterally back toward base 154 rather than in some other direction. The terminus is laterally outboard of base 154. The top end 156 of the base 154 and the elbow terminus define a laterally extending opening 180. Frame 152 (base 154, bottom segment 170, and elbow 160) and opening 180 define an interior region 182 of the attachment member. The region outside the interior region may be referred to as the surroundings 184 of interior region 182. The frame is stationary relative to slingbar arm 26.

A laterally extending tab 52 connects the attachment member 150 to the slingbar arm 26. However, other arrangements for connecting the attachment member to the slingbar may be satisfactory or the attachment member 150 may be formed integrally with the slingbar arm 26.

The attachment member also includes a closure element 190 comprising an actuator wing 192 and a closure wing 194 that meet at a juncture 196. Actuator wing 192 has an actuator wing terminus 204. Closure wing 194 has a closure wing terminus 206. The wing termini are spaced from each other thereby defining an aperture 208.

Actuator wing 192 has a profile that approximately matches the profile of the frame base 154, bottom segment 170 and elbow 160 taken collectively. That is, the part of the actuator wing 192 from juncture 196 to arc 212 is about the same size and shape as frame base 154, and the rest of the actuator wing 192 is about the same size and shape as the frame bottom segment 170 and elbow 160 except that the actuator wing is foreshortened in comparison to elbow 160 and does not curve so that its actuator wing terminus 204 faces back toward juncture 196.

Figure 17:
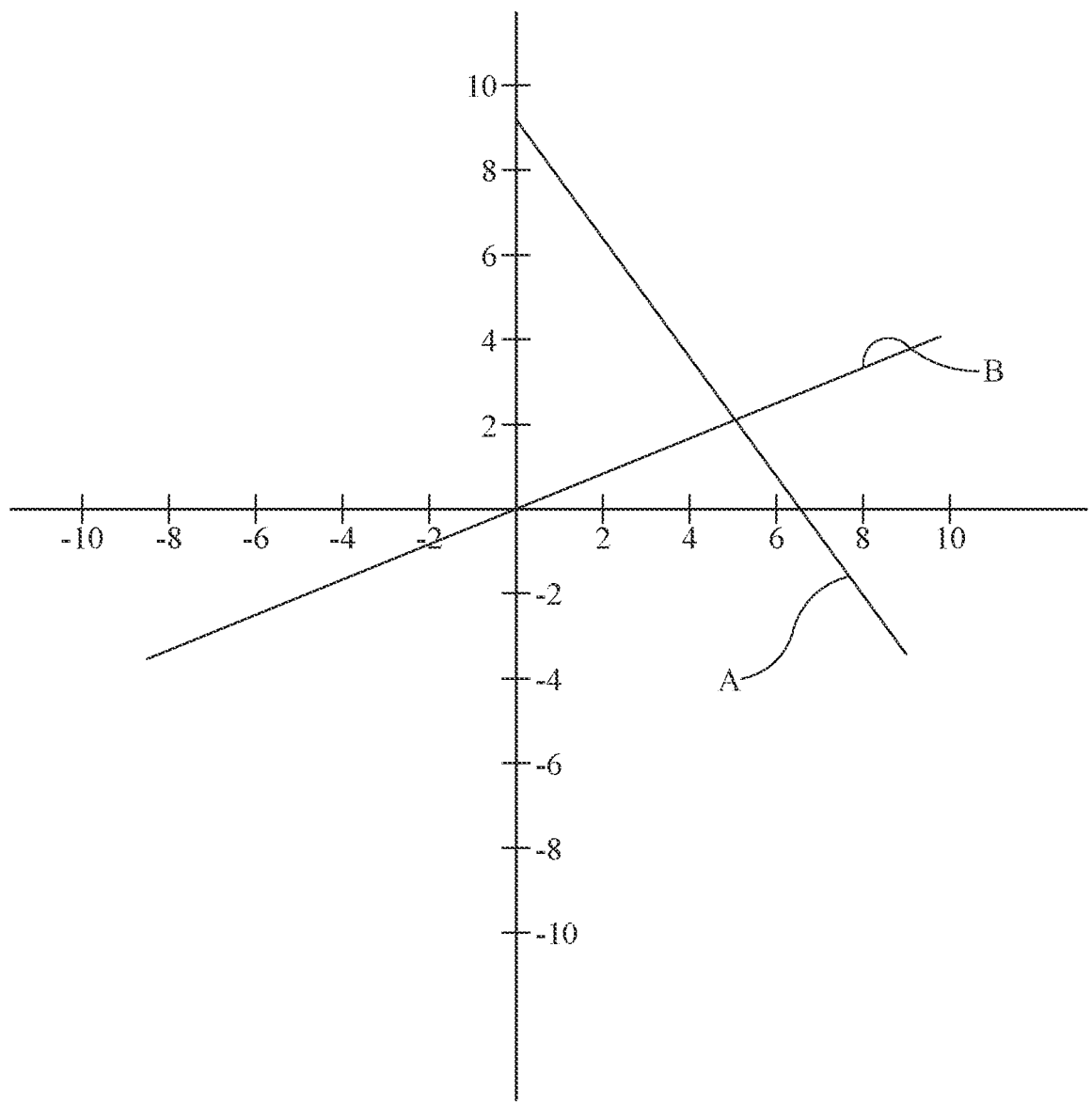
FIG. 17 is a graph showing the meaning of steepness, shallowness and similar terms as used herein in connection with the Funnel Style closure element.

At juncture 196 the closure element is connected by a hinge 216 to the top of the base so that it can swivel relative to frame 152. As seen in FIG. 11, the closure element is positionable in an open orientation in which at least part of actuator wing 192 (the part extending from juncture 196 to arc 212) spans across frame opening 180 and in which aperture 208 is exposed to surroundings 184. A spring 218, illustrated schematically, rotationally biases the closure element to its open orientation. Thus, the default orientation of the closure element is the open orientation. The default state of the attachment member corresponds to the default orientation of the closure element, and is referred to as the default state of the attachment member. As seen in FIG. 17 the closure element is also positionable in a closed orientation in which closure wing 194 spans across or substantially across frame opening 180 thereby placing the attachment member in a closed state. In the closed state aperture 208 is not exposed to surroundings 184. The closure element is rotatable to its closed orientation by a force acting on actuator wing 192 and directed toward interior region 182

When the attachment member is in its open state, closure element aperture 208 is vertically spaced from opening 180 so that the aperture resides in and is exposed to surroundings 184. As a result, the closure member can receive a sling strap by way of aperture 208. When the closure element is in its open orientation of FIG. 16 closure wing 194 is rotationally misaligned with frame opening 180, and actuator wing 192 is rotationally misaligned with base 154, bottom segment 170 and elbow 160 of frame 152. When the closure element is in its closed orientation of FIG. 12, closure wing 194 is rotationally aligned with frame opening 180, and actuator wing 192 is rotationally aligned with base 154, bottom segment 170 and elbow 160 of the frame 152.

Figure 13:
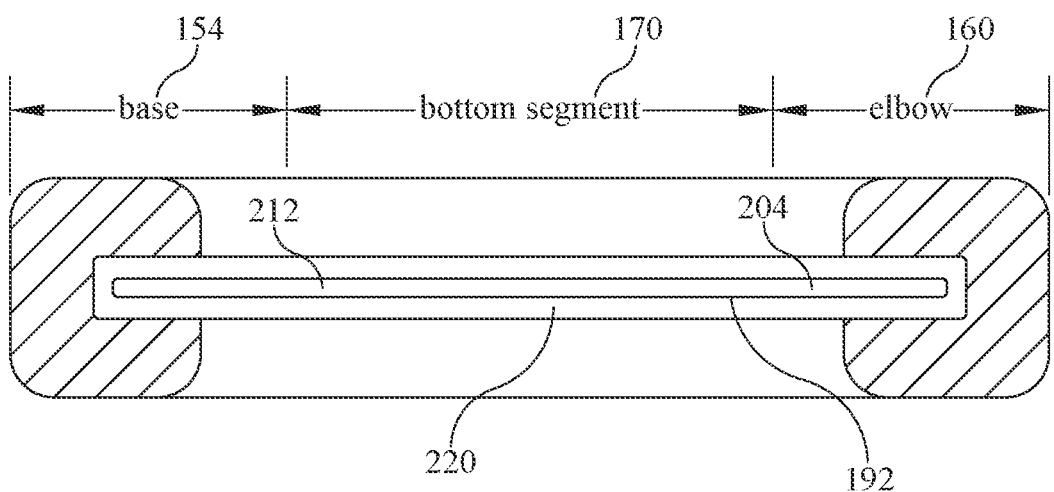
FIG. 13 is a view in the direction 13-13 of FIG. 17.

Referring additionally to FIG. 13, in one embodiment when the closure element is in its closed orientation the actuator wing 192 nests in a slot 220 of the base 154, bottom segment 170, and elbow 160.

Referring to FIGS. 14-15, in practice, a caregiver installs a sling strap on the attachment member by guiding the strap through aperture 208 when the closure element is in its open orientation (corresponding to the attachment member being in its open state) and draping the strap over actuator wing 192 as seen in FIG. 14. If the strength of spring 218 is relatively weak, the weight of strap 22 acting on actuator wing 192 may be sufficient to rotate the closure element to the closed orientation of FIG. 15, corresponding to the closed state of the attachment member. If the spring is relatively strong, the closure element may not rotate to and remain in its closed orientation until the lift system is operated and at least some of the patient's weight is transferred to the actuator wing of the closure element by way of strap 22. The spring strength is a matter of discretion for the designer. Either way, once the spring force is overcome and the closure element rotates to its closed orientation, bottom segment 170 of frame 152 supports the weight applied to the sling strap and some or all of the weight of the patient. The weight maintains the closure element in its closed orientation (and the attachment member in its closed state) without requiring additional locking components.

A caregiver removes the sling strap from the attachment member by lifting the strap off frame bottom segment 170 thereby allowing spring 218, if weak, to rotate the closure element back to its open orientation, corresponding the the open state of the attachment member. If the spring is strong, the closure element will rotate to its open orientation, without caregiver intervention, once enough of the patient's weight is no longer being transferred by the sling strap 22 to bottom segment 170 of the frame.

Funnel Style

Figure 16:
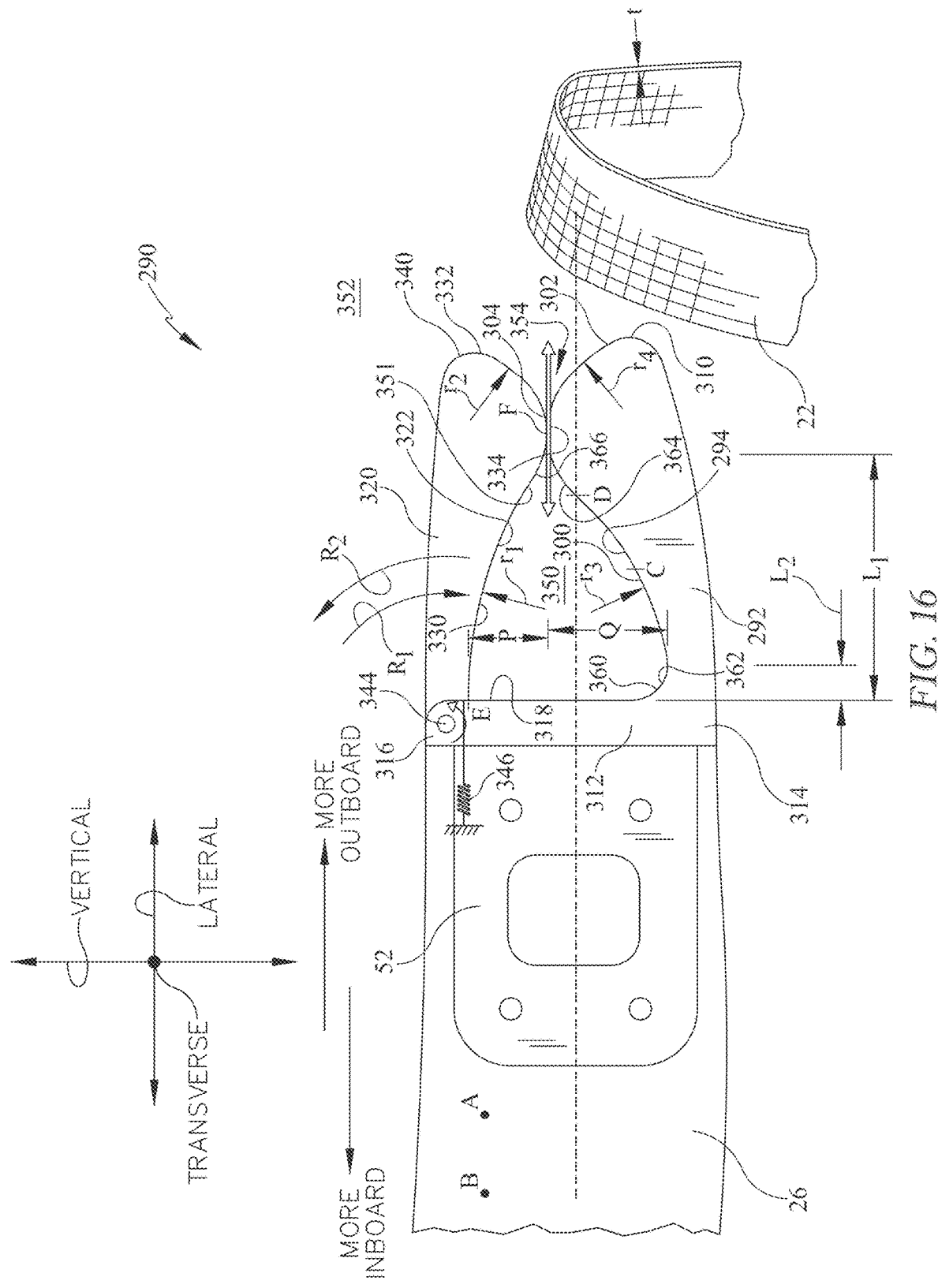
FIG. 16 is an elevation view of an attachment member of a slingbar having a "Funnel Style" closure element.

Referring to FIG. 16, attachment member 290 includes a fixed orientation lower jaw 292 having a lower jaw interior surface 294 that includes an inboard surface segment 300, an outboard surface segment 302, and an intermediate segment 304 laterally between the inboard and outboard segments. Outboard surface segment 302 extends laterally from the intermediate segment to the laterally outermost extremity 310 of lower jaw 292. The lower jaw also includes a vertically extending base 312 having a wall 318, a bottom end 314 and a top end 316. The lower jaw is stationary relative to slingbar arm 26.

The attachment member also includes a variable orientation upper jaw 320 having an upper jaw interior surface 322 that includes an inboard surface segment 330, an outboard surface segment 332, and an intermediate segment 334 laterally between the inboard and outboard segments. Outboard surface segment 332 extends laterally from the intermediate segment to the laterally outermost extremity 340 of upper jaw 320. A hinge 344 connects the upper and lower jaws to each other so that the upper jaw is rotatable, i.e. orientation adjustable relative to the lower jaw. Inboard surface segments 300, 330, along with base 312, define an interior region 350 of the attachment member. The region outside the interior region may be referred to as the environment 352 of interior region 350. In the following description surfaces 294, 322 and the various segments of those surfaces are referred to as lower and upper respectively due to their relative vertical positions as seen in FIG. 16.

The attachment member has a closed state, which corresponds to a closed state of upper jaw 320, in which intermediate segments 304, 334 are at a minimum vertical separation from each other. A biasing element such as spring 346 biases the upper jaw in rotational sense $R_1$ to achieve the closed state. The closed state is therefore the default state. The illustrated minimum vertical separation is zero separation. Therefore, segments 304, 334 are in contact with each other. It is believed beneficial to make the lateral length of the intermediate segments as small as possible, in which case the contact between intermediate segments 304 and 334 approximates a transversely extending line contact. Zero minimum separation is believed to be more effective than nonzero separation, however separation may be made nonzero if desired. In any event, the separation should be smaller than the thickness t of strap 22.

A laterally extending tab 52 connects the attachment member 290 to the slingbar arm 26. However, other arrangements for connecting the attachment member to the slingbar may be satisfactory, or the attachment member 290 may be formed integrally with the slingbar arm 26.

Referring to the attachment member in its closed state as illustrated in FIG. 16, upper inboard surface segment 330 has a descending contour (i.e. descends) with increasing outward displacement, and lower inboard surface segment 300 has an ascending contour (i.e. ascends) with increasing outward displacement. Whether a surface segment or a portion thereof is "ascending or "descending" or is steep or shallow is based on the slingbar being in the orientation of FIG. 2 (slingbar arms 26 generally parallel to the ground and coupler 28 extending above the arms and with the orientation adjustable upper jaw in its closed state as seen in FIG. 16) and evaluated using the vertical axis of FIG. 16 as a reference. "Increasing outward displacement" means more outboard relative to slingbar centerline $CL_S$ (FIG. 2). For example, point "A" of FIG. 16 is outboard of point "B" and therefore is more outwardly displaced. The term "increasing inward displacement" means more inboard relative to slingbar centerline $CL_S$. For example, point "B" is inward of point "A" and therefore is more inwardly displaced (or less outwardly displaced). "Descending", as a descriptor of the surface contour, means in the direction of lower elevation whereas "ascending" means in the direction of a higher elevation.

Continuing to refer to FIG. 16, upper outboard surface segment 332 has an ascending contour with increasing outward displacement and lower outboard surface segment 302 has a descending contour with increasing outward displacement.

Lower inboard surface segment 300 and upper inboard surface segment 330 each have a laterally varying steepness or slope. As used herein, steepness is evaluated independently of whether a surface segment is ascending or descending. Referring briefly to FIG. 17, in some contexts line A would be considered less steep than line B because its slope is negative (specifically −2) whereas the slope of line B is positive (specifically +0.5), and a negative number is considered to be smaller than a positive number. We adopt instead an absolute value approach in which line A is steeper than line B because |−2|>|0.5|.

The descending contour of the upper inboard segment has an inflection point 366 outboard of which the descending contour becomes progressively more shallow with increasing outward displacement. The ascending contour of the lower inboard segment has an inflection point 364 outboard of which the ascending contour becomes progressively more shallow with increasing outward displacement.

In principle the above described ascending and descending contours could be applied only to the inboard surface segments 300, 330 or only to the outboard surface segments 302, 332, however it is believed best to contour all four surface segments as in the example of FIG. 16.

Because of the descending and ascending contours of the inboard surface segments 330, 300, those surface segments define a inboard funnel-like shape 351 which converges as one progresses increasingly in the outward or outboard direction from base 312 to intermediate segments 304, 334. Because of the descending and ascending contours of the outboard surface segments 302, 332, those surface segments define an outboard funnel-like shape 354 which converges as one progresses increasingly in the inward or inboard direction from environment 352 toward intermediate segments 304, 334.

The contour of lower inboard surface segment 300 could be ascending over the entire lateral range from base 312 to intermediate segment 304, as suggested by the dashed line near the inward most extremity of surface segment 300. However, the lower surface may instead include a pocket 360 at its inboard extremity. The pocket is defined by an inboard subsegment 362 of lower inboard surface segment 300 that, unlike the rest of the surface, has a descending contour with increasing outward displacement. Taking the distance from wall 318 to intermediate segments 304, 334 to be the lateral extent $L_1$ of lower inboard surface segment 300, and taking the distance from the base wall to the outboard end of inboard subsegment 362 to be subsegment lateral extent $L_2$, $L_2$ is no more than about 25% of $L_1$, i.e. $L_1/L_2<0.25$. In some embodiments $L_1/L_2$ may be no more than about 0.15.

In some embodiments the steepness of lower inboard surface segment 300 everywhere along at least a portion of its lateral range or extent (e.g. from C to D) is greater than the steepness of the upper inboard surface segment 330 anywhere along its lateral range or extent (from E to F). The same may be true for other portions of its lateral range, including subsets of portion CD.

The contours of inboard surface segments 300, 330 each have a vertical range taken between an elevation extremum of the surface at or near base 312 and the closed state elevations of intermediate segments 304, 334. For example, the vertical range of the descending contour of the upper inboard surface segment is distance P, and the vertical range of the ascending contour of the lower inboard surface segment is distance Q. These are referred to as the upper segment vertical range and the lower segment vertical range to distinguish them from each other. In some embodiments, such as the embodiment of FIG. 16, the lower segment vertical range Q exceeds the upper segment vertical range P.

The inboard surface segment 330 of the upper surface, the outboard surface segment 332 of the upper surface, the inboard surface segment 300 of the lower surface and the outboard surface segment 302 of the lower surface each have a radius of curvature, illustrated as $r_1$, $r_2$, $r_3$, $r_4$. The lengths of the radii vectors in the drawing are illustrative rather than an accurate portrayal of the radii of curvature of the surface segments as depicted in the drawing. The radii of curvature of inboard surface segments 300, 330 apply only to the long concave portions of those surface segments, not to the small portions outboard of inflection points 364, 366 that converge convexly toward intermediate segments 304, 334. All four radii of curvature may be constant, all four may be variable, or some may be constant and others variable.

In practice a user installs a sling strap 22 into interior region 350 by guiding the strap inwardly into the outboard funnel 354 defined between upper and lower outboard surface segments 332, 302. The caregiver pulls the strap in the inboard direction. Outboard funnel 354 pilots the strap toward intermediate segments 304, 334. As the caregiver continues pulling on the strap, it bears against lower and upper jaws 292, 320 in the vicinity of the intermediate segments (and/or against the intermediate segments themselves) and forces variable orientation upper jaw 320 to rotate in rotational sense $R_2$ so that the strap slides vertically between and inwardly past the intermediate segments 304, 334 and into interior region 350. Spring 346 forces upper jaw 320 back into contact with (or into its minimum separation with) lower jaw 292. The attachment member and upper jaw 320 may each be thought of as being in their open states when strap 22 causes upper jaw 320 to be rotated in direction $R_2$.

Because of the geometry of the lower inboard surface segment 300 (its steepness, vertical range, radius of curvature (whether constant or variable) or combinations of these features), when patient weight is applied to the strap, the strap tends to move laterally away from the intermediate segments and toward base 312, thereby minimizing the likelihood that the strap will unintentionally slip out of the interior and into the environment. The strap naturally seats itself in pocket 360 due to the geometry of the pocket.

A user removes a sling strap 22 from interior region 350 by guiding the strap into the inboard funnel 351 defined between upper and lower inboard surface segments 330, 300. Inboard funnel 351 pilots the strap toward intermediate segments 304, 334. The contours of interior surfaces 294, 322 are adapted so that an object, which is urged laterally outwardly, can separate the contact segments from each other and pass outwardly between the contact segments. Therefore as the caregiver continues pulling on the strap, it bears against the upper and lower jaws 292, 320 in the vicinity of the intermediate segments (and/or against the intermediate segments themselves) and forces variable orientation upper jaw 320 to rotate in rotational sense $R_2$ so that the strap slides vertically between and outwardly past the intermediate segments 304, 334 and into environment 352. Spring 346 forces upper jaw 320 back into contact with (or into its minimum separation with) lower jaw 292.

Automatic, Weight Actuated Style

Figure 18:
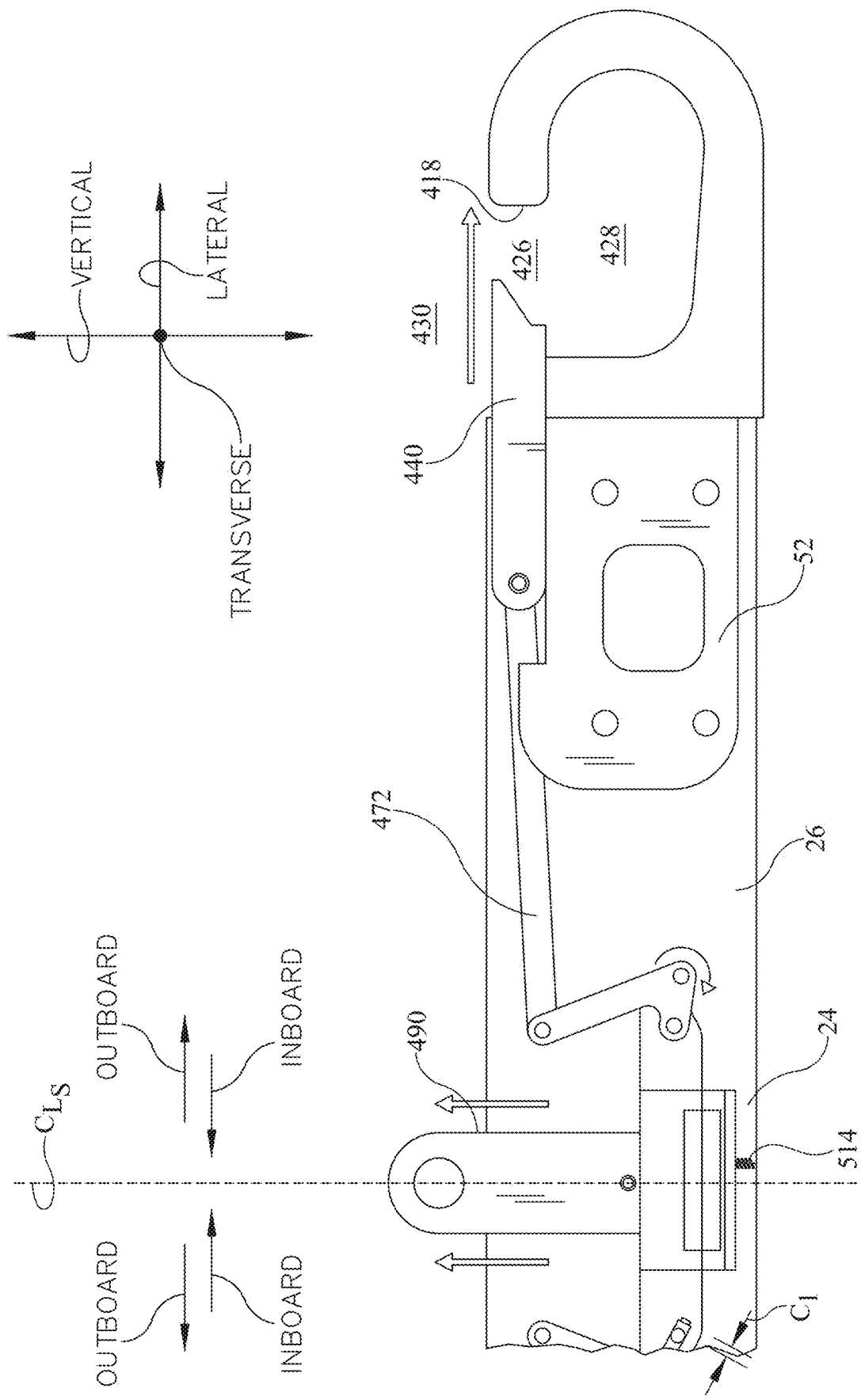
FIG. 18 is a cross sectional elevation view of an "Automatic Weight Actuated" closure element showing the attachment member in its open state.

Referring to FIGS. 18-21, attachment member 400 includes a frame 402 having a base 404 that extends vertically from a top end 408 to a bottom end 412, and an elbow 414 laterally spaced from the base 404 and having a bottom end 416 and a terminus 418. The frame 402 also includes a bottom segment 420 joining the bottom end 416 of the base 404 to the bottom end 414 of the elbow 414. Alternatively, the bottom segment and elbow, taken together, may be thought of as a hook, similar to hook 72 of FIG. 4, which is comprised of bottom segment 76 and elbow 78. The curvature of elbow 414 is such that elbow terminus 418 faces laterally back toward base 404 rather than in some other direction. Elbow terminus 418 is laterally outboard of base 404. The top end of the base and the elbow terminus define an opening 426 (FIG. 18). Frame 402 (base 404, bottom segment 420, and elbow 414) and opening 426 define an interior region 428 of the attachment member. The region outside the interior region may be referred to as the surroundings 430 of interior region 428. The frame is stationary relative to slingbar arm 26. The attachment member also includes a closure element 440, also referred to as a gate 440.

A laterally extending tab 52 connects the attachment member 400 to the slingbar arm 26. However, other arrangements for connecting the attachment member to the slingbar may be satisfactory or the attachment member 400 may be formed integrally with the slingbar arm 26.

The slingbar also includes an actuating mechanism. The actuating mechanism includes a cam 442 residing at the lateral center of the slingbar. The cam includes a cam hub 444 and a pair of arms 446 extending from the cam hub in laterally opposite directions. Each cam arm includes a cam guide slot 448 (readily visible only in FIG. 19) inclined so that its outboard end is at a higher elevation than its inboard end. The slingbar halves on opposite sides of transverse/vertical center plane $CP_{TV}$ (FIG. 20) are mirror images of each other and therefore it is sufficient to describe only the components on one side of that plane.

The actuating mechanism also includes a linkage 452 arranged to be driven by the cam and to operate the gate in response to motion of the cam thereby causing the gate to block or expose opening 426. Linkage 452 includes a bellcrank 454 having a hinge 456 pivotally mounted to slingbar arm 26, a follower arm 458 extending from the hinge to a driven end 462 of the follower arm, and an output arm 464 extending from the hinge to a driving end 466 of the output arm. Driven end 462 slidably engages cam guide slot 448 for example by way of pin 470.

Driving end 466 of output arm 464 is connected to gate 440. The connection between the output arm and the gate may be a direct connection in which driving end 466 is directly connected to the gate. However, in the illustrated embodiment linkage 452 includes a connector link 472, whose opposite ends 476, 478 are connected respectively to driving end 466 of bellcrank output arm 464 and to a gate hinge 482 thereby establishing an indirect connection between bellcrank output arm 464 and gate 440.

The slingbar also includes a cam driver 490 adapted to drive cam 442. The cam driver includes a shank 492, which extends through a bore 494 in cam 442, and a head 496. The head has a diameter larger than that of bore 494 and is in contact with the bottom of cam 442. The end of the shank opposite head 496 includes an attachment lug 510 with an eyelet 512. The lug may be used to connect the slingbar to a hoist such as a coupler 28 (FIGS. 2, 3) associated with a hoist so that the slingbar can be hoisted vertically.

The cam driver and the cam are vertically translatable relative to slingbar arms 26. The cam driver and cam are biased vertically downwardly by a biasing element such as spring 514 so that the default or open state of the attachment member is one in which gate 440 is retracted thereby exposing opening 426 (FIG. 18). The associated position of the cam driver is referred to as its fully open position. When the cam driver is in its fully open position, pin 470 is spaced from the lower end of cam guide slot 448 by a clearance $C_1$.

Figure 19:
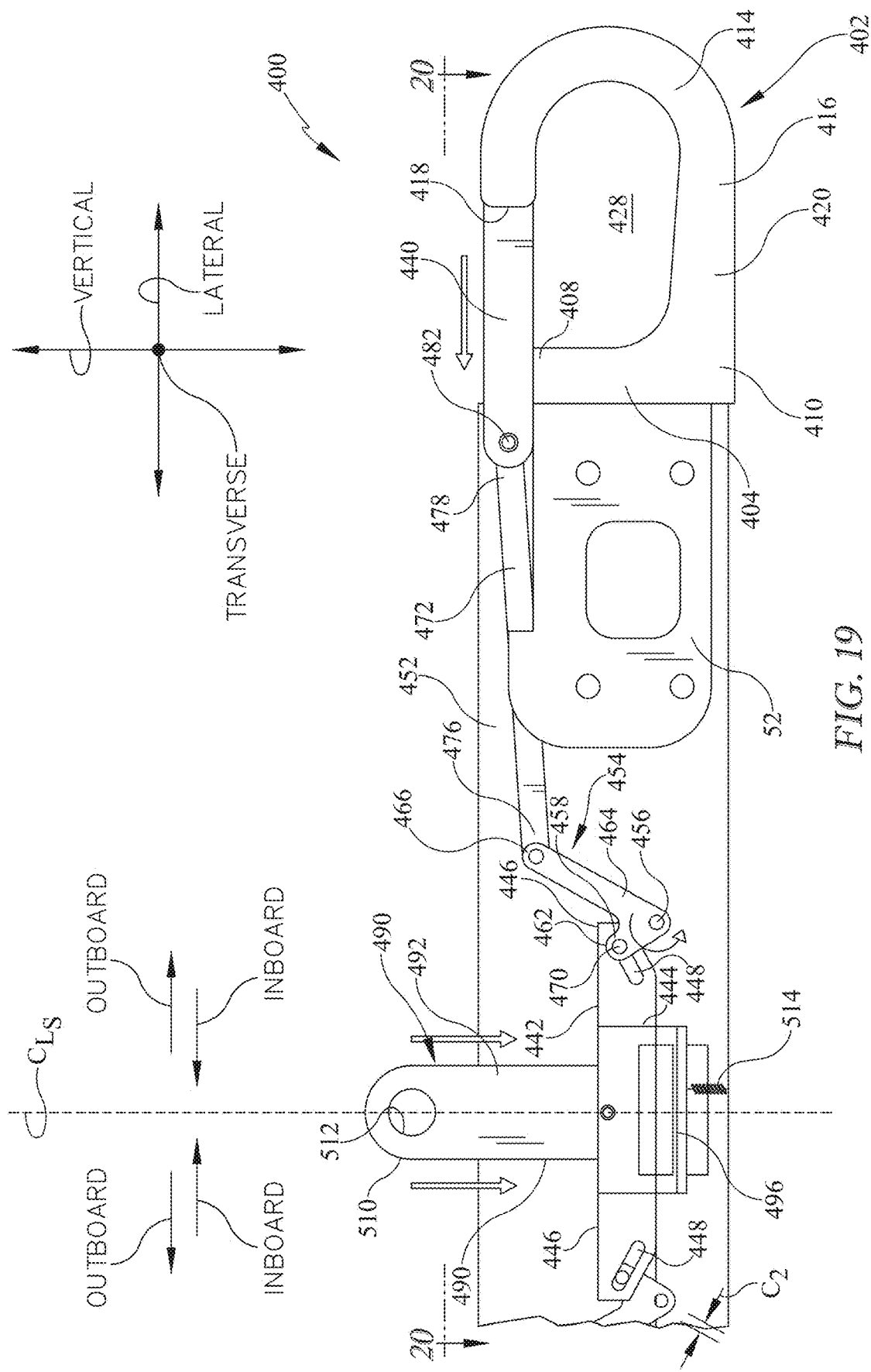
FIG. 19 is an elevation view of an "Automatic Weight Actuated" closure element showing the attachment member in its closed state.
Figure 20:
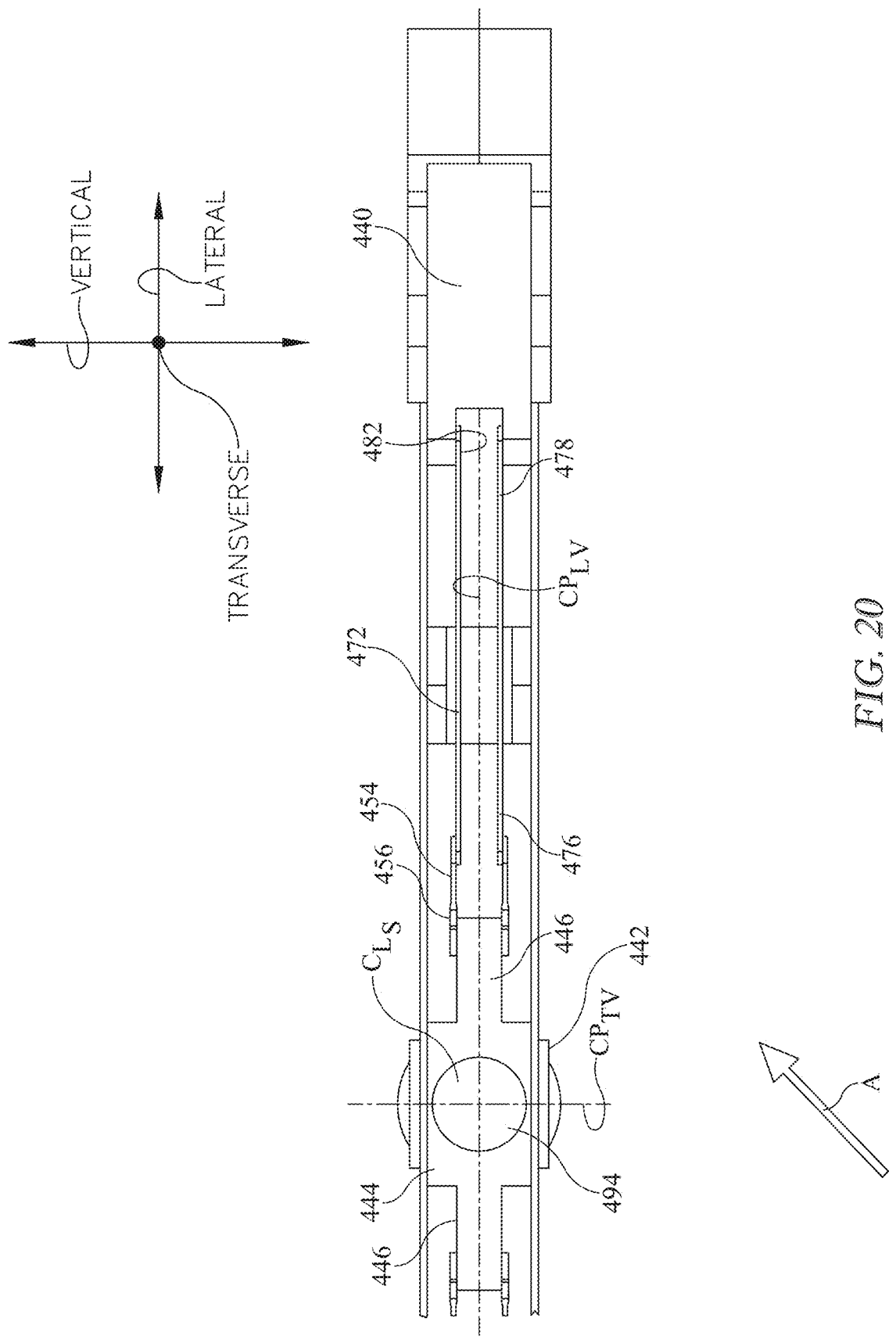
FIG. 20 is a plan view in direction 20-20 of FIG. 19.
Figure 21:
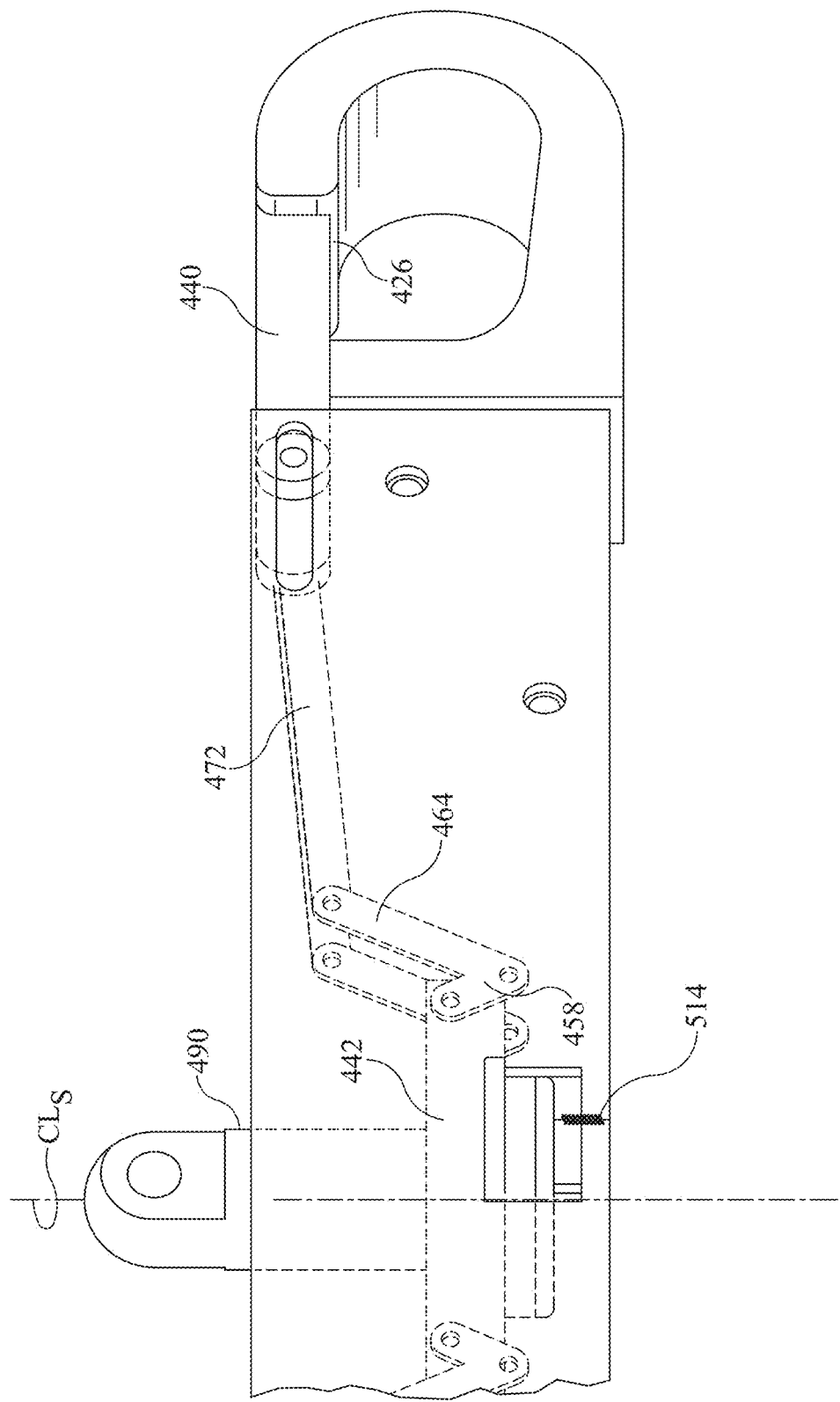
FIG. 21 is a view taken in approximately direction A of FIG. 20.

Referring to FIG. 19 the application of patient weight to attachment member frame 402, and the attendant upwardly directed reaction force at attachment lug 510, causes cam driver 490, and therefore cam 442, to translate upwardly relative to the slingbar arms 26 to its fully closed position. This may instead be thought of as the weight causing the slingbar arms to translate downwardly relative to the cam driver and cam. The closed position of the cam driver corresponds to a closed state of the attachment member in which gate 440 is extended and closes or blocks opening 426. When the cam driver is in its fully closed position, pin 470 is spaced from the upper end of cam guide slot 448 by a clearance $C_2$ that may be the same as clearance $C_1$.

With the attachment member in its open state of FIG. 18 and opening 426 exposed, a caregiver or other user guides a slingbar strap into interior region 428 by way of opening 426. When an upwardly directed hoisting force is applied at lug 510 the patient's weight is transferred from his bed or chair to the slingbar (principally to bottom segment 420 of frame 402) and therefore to cam driver 490 and cam 442. The force exerted on the cam and cam driver overcomes the spring force of spring 514 causing the cam and cam driver to translate upwardly relative to the slingbar arms 26 (or, equivalently, the slingbar arms can be thought of as translating downwardly relative to the cam driver and cam).

Pin 470 is confined to cam guide slot 448 and is at a fixed distance or radius from hinge 456. Therefore as the cam translates upwardly, pin 470 slides along cam guide slot 448, causing bellcrank 454 to rotate at hinge 456 (clockwise as seen in FIGS. 18-19). Bellcrank output arm 464 urges gate 440 in a laterally outboard direction thereby extending the gate across opening 426 and closing the opening as seen in FIG. 19. In the illustrated embodiment, the output arm acts on the gate by way of connector link 472. Irrespective of whether connector link 472 is present or not, vertical translation of cam 442 is converted to horizontal translation of gate 440.

In practice the spring force of spring 514 is such that when the device is used as specified the linkage will attain the limits of FIGS. 18 (open limit) and 19 (closed limit) rather than come to a stop at some state intermediate those depicted in FIGS. 18 and 19. In particular, the spring is strong enough that even with no weight applied, the linkage will arrive at the limit of FIG. 18. The spring is weak enough that the weight of even a lightweight patient will cause the linkage to arrive at the limit of FIG. 19. Stated differently, the strength of the spring is such that the cam driver bottoms out as seen in FIG. 18 when no patient weight is applied, and tops out as seen in FIG. 19 when a pre-specified threshold patient weight is applied.

Operation of gate 440 of the weight actuated attachment member is passive in the sense that the caregiver is not required to manipulate the closure member itself or any other element of the device. When no patient weight is applied, the closure member is naturally open. No user intervention related to the closure member is required. The closure element closes in response to the application patient weight. Again, no user intervention related to the closure member is required. The user's role is limited to positioning the sling under the patient, slipping the sling straps into interior region 428 of the attachment member, and operating the hoist to lift the patient.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A slingbar, comprising:
   a sling attachment member comprising:
   a frame comprising a base having a top end and a bottom end, and a hook extending from the bottom end to a hook terminus, the hook terminus and the top end of the base defining an opening, and the hook, the base, and the opening bounding an interior of the sling attachment member, and
   a closure element comprising an outboard gate hinged to the hook terminus and an inboard gate hinged to the base, the outboard gate and the inboard gate each having a default state in which each gate extends laterally only part way across the opening, wherein one of the inboard gate and the outboard gate is an inwardly rotatable gate and the other of the inboard gate and the outboard gate is an outwardly rotatable gate.

2. The slingbar of claim 1, comprising an outboard spring which biases the outboard gate toward the default state and an inboard spring which biases the inboard gate toward the default state.

3. The slingbar of claim 1, comprising an outboard spring which resists but does not prevent rotatability of the outboard gate in a first rotational sense, and an inboard spring which resists but does not prevent rotatability of the inboard gate in a second rotational sense which is opposite the first rotational sense.

4. The slingbar of claim 1, wherein the inboard gate and the outboard gate contact each other in the default state.

5. The slingbar of claim 1, wherein the inboard gate and the outboard gate each comprise a free end that is complementary to the free end of the other of the inboard gate and the outboard gate, such that the free end of the outboard gate and the free end of the inboard gate meet at a common angled interface.

6. The slingbar of claim 5, wherein the free end of the outboard gate and the free end of the inboard gate are chamfered.

7. The slingbar of claim 1, wherein:
   each of the inboard gate and the outboard gate has an open state and a closed state; and
   only one of the inboard gate or the outboard gate is required to be in the open state to accommodate passage of an object through the opening.

8. A sling attachment member for a slingbar, the sling attachment member comprising:
   a frame comprising a base having a top end and a bottom end, and a hook extending from the bottom end to a hook terminus, the hook terminus and the top end of the base defining an opening, and the hook, the base, and the opening bounding an interior of the sling attachment member; and
   a closure element comprising an outboard gate hinged to the hook terminus and an inboard gate hinged to the base, the outboard gate and the inboard gate each having a default state in which each gate extends laterally only part way across the opening, wherein the inboard gate and the outboard gate contact each other in the default state.

9. The sling attachment member of claim 8, wherein one of the inboard gate and the outboard gate is an inwardly rotatable gate and the other of the inboard gate and the outboard gate is an outwardly rotatable gate.

10. The sling attachment member of claim 9, comprising an outboard spring which biases the outboard gate toward the default state and an inboard spring which biases the inboard gate toward the default state.

11. The sling attachment member of claim 9, comprising an outboard spring which resists but does not prevent rotatability of the outboard gate in a first rotational sense, and an inboard spring which resists but does not prevent rotatability of the inboard gate in a second rotational sense which is opposite the first rotational sense.

12. The sling attachment member of claim 8, wherein the inboard gate and the outboard gate each comprise a free end that is complementary to the free end of the other of the inboard gate and the outboard gate.

13. The sling attachment member of claim 12, wherein the free end of the outboard gate and the free end of the inboard gate are chamfered.

14. The sling attachment member of claim 8, wherein:
    each of the inboard gate and the outboard gate has an open state and a closed state; and
    only one of the inboard gate or the outboard gate is required to be in the open state to accommodate passage of an object through the opening.

15. A lift system, comprising:
    a hoist comprising a carriage from which an extendable and retractable tether extends; and
    a slingbar coupled to the tether, the slingbar comprising:
    a sling attachment member comprising:
    a frame comprising a base having a top end and a bottom end, and a hook extending from the bottom end to a hook terminus, the hook terminus and the top end of the base defining an opening, and the hook, the base, and the opening bounding an interior of the sling attachment member, and
    a closure element comprising an outboard gate hinged to the hook terminus and an inboard gate hinged to the base, the outboard gate and the inboard gate each having a default state in which each gate extends laterally only part way across the opening, wherein one of the inboard gate and the outboard gate is an inwardly rotatable gate and the other of the inboard gate and the outboard gate is an outwardly rotatable gate.

16. The lift system of claim 15, wherein the hoist is supported from the ceiling of a facility by a ceiling mounted rail system.

17. The lift system of claim 15, wherein the carriage houses a motor driven reel to extend or retract the tether.

18. The lift system of claim 15, wherein the hoist is a freestanding frame unit.

* * * * *